US011917188B2

(12) United States Patent
Anderson et al.

(10) Patent No.: US 11,917,188 B2
(45) Date of Patent: Feb. 27, 2024

(54) PARAMETER MAP FOR MACHINE-LEARNED VIDEO COMPRESSION

(71) Applicant: WaveOne Inc., Palo Alto, CA (US)

(72) Inventors: Alexander G. Anderson, Mountain View, CA (US); Oren Rippel, Vancouver (CA); Kedar Tatwawadi, Mountain View, CA (US); Sanjay Nair, Fremont, CA (US); Craig Lytle, Los Altos Hills, CA (US); Hervé Guihot, Mountain View, CA (US); Brandon Sprague, Mountain View, CA (US); Lubomir Bourdev, Mountain View, CA (US)

(73) Assignee: WAVEONE INC., Mountain View, CA (US)

( * ) Notice: Subject to any disclaimer, the term of this patent is extended or adjusted under 35 U.S.C. 154(b) by 0 days.

(21) Appl. No.: 17/466,797

(22) Filed: Sep. 3, 2021

(65) Prior Publication Data

US 2022/0224914 A1 Jul. 14, 2022

Related U.S. Application Data

(60) Provisional application No. 63/136,648, filed on Jan. 13, 2021.

(51) Int. Cl.
*H04N 19/52* (2014.01)
*H04N 19/105* (2014.01)
(Continued)

(52) U.S. Cl.
CPC ............. *H04N 19/52* (2014.11); *G06N 3/04* (2013.01); *G06N 3/08* (2013.01); *H04N 19/105* (2014.11);
(Continued)

(58) Field of Classification Search
CPC .... H04N 19/52; H04N 19/105; H04N 19/114; H04N 19/149; H04N 19/166;
(Continued)

(56) References Cited

U.S. PATENT DOCUMENTS 10,402,722 B2  9/2019  Rippel et al.
10,565,499 B2  2/2020  Bourdev et al.
(Continued)

*Primary Examiner* — Tracy Y. Li
(74) *Attorney, Agent, or Firm* — BakerHostetler

(57) ABSTRACT

A compression system trains a machine-learned compression model that includes components for an encoder and decoder. In one embodiment, the compression model is trained to receive parameter information on how a target frame should be encoded with respect to one or more encoding parameters, and encodes the target frame according to the respective values of the encoding parameters for the target frame. In particular, the encoder of the compression model includes at least an encoding system configured to encode a target frame and generate compressed code that can be transmitted by, for example, a sender system to a receiver system. The decoder of the compression model includes a decoding system trained in conjunction with the encoding system. The decoding system is configured to receive the compressed code for the target frame and reconstruct the target frame for the receiver system.

21 Claims, 9 Drawing Sheets

(51) Int. Cl.
  *G06N 3/08* (2023.01)
  *H04N 19/176* (2014.01)
  *H04N 19/30* (2014.01)
  *H04N 19/114* (2014.01)
  *H04N 19/149* (2014.01)
  *H04N 19/166* (2014.01)
  *H04N 19/172* (2014.01)
  *H04N 19/65* (2014.01)
  *G06N 3/04* (2023.01)

(52) U.S. Cl.
  CPC ......... *H04N 19/114* (2014.11); *H04N 19/149* (2014.11); *H04N 19/166* (2014.11); *H04N 19/172* (2014.11); *H04N 19/176* (2014.11); *H04N 19/30* (2014.11); *H04N 19/65* (2014.11)

(58) Field of Classification Search
  CPC .... H04N 19/172; H04N 19/176; H04N 19/30; H04N 19/65; G06N 3/04; G06N 3/08
  See application file for complete search history.

(56) References Cited

U.S. PATENT DOCUMENTS

| | | |
|---|---|---|
| 11,315,011 B2 | 4/2022 | Rippel et al. |
| 2018/0174047 A1* | 6/2018 | Bourdev .......... G06V 30/18057 |
| 2020/0126186 A1* | 4/2020 | Kim .................. H04N 21/8193 |
| 2021/0281867 A1* | 9/2021 | Golinski ............. G06N 3/0445 |

\* cited by examiner

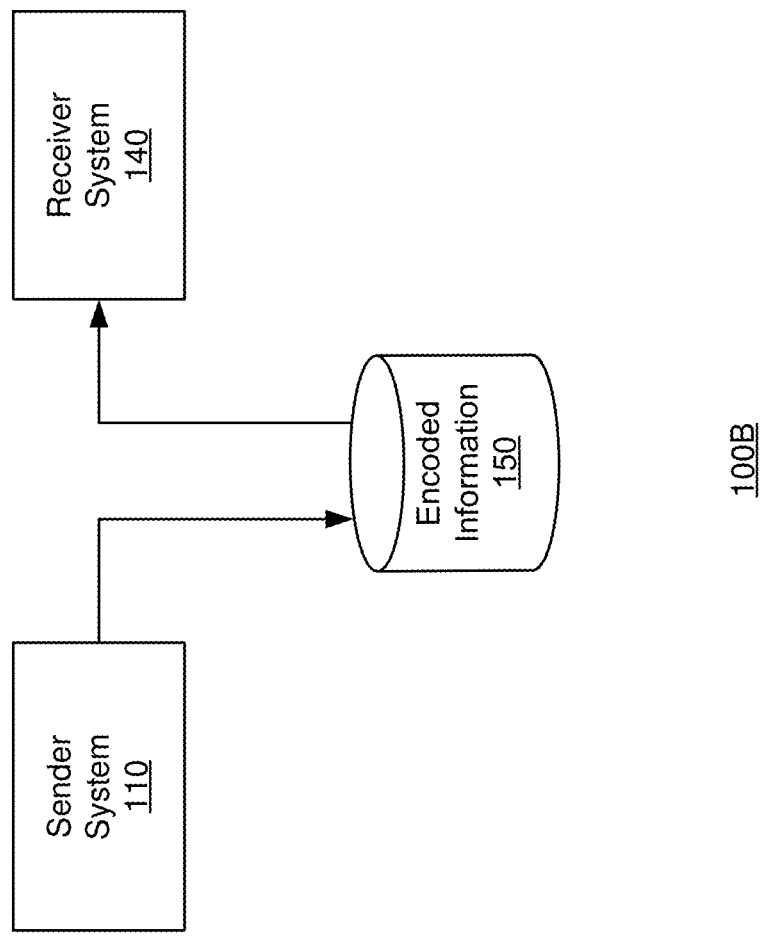

PARAMETER MAP FOR MACHINE-LEARNED VIDEO COMPRESSION

CROSS-REFERENCE TO RELATED APPLICATIONS

This application claims the benefit of provisional U.S. Application No. 63/136,648, filed on Jan. 13, 2021, which is incorporated by reference herein in its entirety.

BACKGROUND

This invention generally relates to encoding and decoding videos, and more specifically to encoding and decoding videos with respect to one or more encoding parameters using a machine learned compression model.

Various online systems transmit information to and from one another over a network. The information may be in the form of images, videos that include a sequence of frames, or text. A sender typically encodes the information using an encoder into a compressed form, and the compressed information is transmitted to the receiver. The receiver can then decode the compressed information using a decoder to reconstruct the original information. A video typically includes a sequence of image frames that capture the motion of objects and background of a scene that occur due to movement of the camera or movement of the objects themselves. Compared to other types of information, video compression can be challenging due to large file size and issues such as video and audio synchronization. Video compression for lower-power devices, such as smartphones, can be even more challenging.

SUMMARY

A compression system trains a machine-learned compression model that includes components for an encoder and decoder. In one embodiment, the compression model is trained to receive parameter information on how a target frame should be encoded with respect to one or more encoding parameters, and encodes the target frame according to the respective values of the encoding parameters for the target frame. In particular, the encoder of the compression model includes at least an encoding system configured to encode a target frame and generate compressed code that can be transmitted by, for example, a sender system to a receiver system. The decoder of the compression model includes a decoding system trained in conjunction with the encoding system. The decoding system is configured to receive the compressed code for the target frame and reconstruct the target frame for the receiver system.

The encoding parameter controls one or more properties of how a target frame is encoded and decoded using the encoder and decoder of the machine-learned compression model. The encoding parameter may relate to, for example, the reconstruction quality or codelength of the target frame or how a target frame is encoded with reference to other frames in the video. In one instance, the encoding parameter is a rate parameter that indicates the desired bitrate of the compressed code for a target frame. The bitrate represents how many bits of information are processed per unit time to transmit the compressed code for the target frame. Thus, a high bitrate indicates that a higher degree of information is used to encode the target frame for a higher reconstruction quality, while a low bitrate indicates that a lower degree of information is used to encode the target frame for a lower reconstruction quality.

In another instance, the encoding parameter is a frame parameter that indicates the type of information used to encode the target frame as a I-frame, a P-frame, or a B-frame. Specifically, a target frame encoded as an I-frame may be encoded and decoded without reference to previously reconstructed frames in the video. On the other hand, a target frame encoded as a P-frame or B-frame may be encoded and decoded with reference to one or more previously reconstructed frames in the video. In particular, a target frame encoded as a P-frame is encoded with respect to changes from a previously reconstructed frame that is placed temporally before or after the target frame in the video. A target frame encoded as a B-frame, on the other hand, is encoded bi-directionally with respect to changes from one or more previously reconstructed frames that are placed temporally before and after the target frame in the video.

During the training process, the compression system iteratively trains the weights for the compression model by applying the compression model to encoding information and parameter information for the training frame to generate compressed code and a reconstructed version of the training frame. The parameter information for the training frame indicates a value for the encoding parameter for the training frame. The compression system updates the weights of the compression model to reduce a loss function. In one instance, the loss function includes a reconstruction loss indicating a difference between the training frame and the reconstructed frame, and a codelength loss indicating the codelength of the compressed code and that depends on the value of the encoding parameter. This process is repeated until a convergence criteria is reached.

By training compression models that incorporate parameter information, the resulting encoders and decoders can address a wide range of values for the encoding parameter by simply specifying the desired value as input to the encoder and the decoder during the deployment process. Responsive to receiving a desired value for a target frame, the encoder of the compression model is trained to output compressed code that, when reconstructed by the decoder, generates a high-quality reconstructed version of the target frame given the constraints or conditions set by the value of the encoding parameter. Rather than having a separate encoder-decoder for each value of the encoding parameter that may lead to inefficient and slow memory loading and unloading, information can be encoded and decoded for different values of the encoding parameter with significant weight sharing within the compression model. This allows for efficient encoding and decoding of information during deployment.

BRIEF DESCRIPTION OF THE DRAWINGS

FIG. 1B is a block diagram of a system environment including a sender system and a receiver system, in accordance with another embodiment.

Figure 1A:
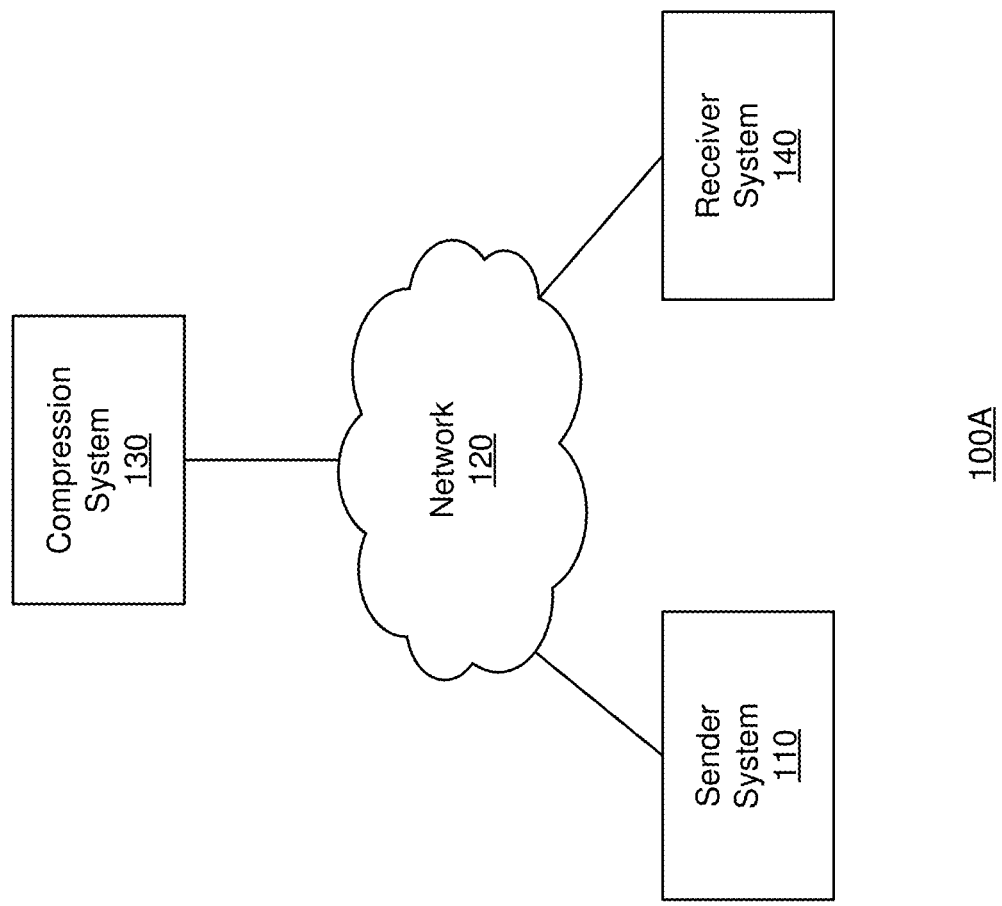
FIG. 1A is a block diagram of a system environment including a compression system, a sender system, and a receiver system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

FIG. 1A is a block diagram of a system environment 100A including a compression system 130, a sender system 110, and a receiver system 140, in accordance with an embodiment. As described in further detail, the sender system 110 includes an encoder, and the receiver system 140 includes a decoder. The encoder and decoder may be trained and provided by the compression system 130. In alternative configurations, different and/or additional components may be included in the system environment 100A.

The compression model 130 trains a compression model to generate an encoder and a decoder that can be deployed by the sender system 110 and the receiver system 140. Specifically, the encoder can be used by a sender system 110 to encode information, such as images, videos, and text, into a compressed form. The compressed information can be transmitted to a receiver system 140, for example, in the form of a bitstream. The decoder can be used by the receiver system 140 to reconstruct the original information based on the bitstream provided by the sender system 110. Specifically, after training the weights of the compression model, certain components of the compression model make up the encoder and the decoder.

In one particular embodiment referred throughout the specification, the information to be encoded and decoded is a video that includes a sequence of frames. The sequence of frames are typically images of the same dimensionality, and capture motions that occur within a scene over time due to movement of the camera or the movement of the objects themselves. Specifically, motions are animated as the positions of pixels that correspond to a particular portion of the scene change throughout the sequence of frames. For example, the movement of a pedestrian walking in the left direction may be animated as the position of the pedestrian gradually shifts toward the left side of the frames. However, it is also appreciated that in other embodiments, the information can be data other than videos, such as a sequence of texts in a document.

In general, video frames, or other types of data derived from video frames may be represented as a tensor. As defined herein, a tensor denotes a multi-dimensional array of values having a width, height, and one or more channels across the depth of the tensor. Thus, a video frame in RGB color may be represented as a tensor with 3 channels, each channel including pixel intensity values for a respective color. As another example, a video frame in grayscale may be represented as a tensor with 1 channel representing pixel intensity values in grayscale. As defined herein, a "position" of an element or pixel in a tensor denotes the position within the width and height of the tensor. Thus, an element at a particular position of a tensor may have a set of values associated with the element that corresponds to the number of channels of the tensor.

In one embodiment, the compression model is trained to receive encoding information for a target frame and parameter information on how the target frame should be encoded with respect to one or more encoding parameters. In particular, the encoder of the compression model includes at least an encoding system configured to receive the encoding information and parameter information for a target frame and generate compressed code that can be transmitted by, for example, the sender system 110 to the receiver system 140. Thus, the encoding information may include any type of information that can be used to encode the target frame into compressed code. For example, the encoding information may include image data of target frame or previously reconstructed frames.

The decoder of the compression model includes a decoding system trained in conjunction with the encoding system. The decoding system is configured to receive decoding information and the parameter information and generate a reconstructed version of the target frame for the receiver system 140. The decoding information may include any type of information that can be used to decode the target frame from compressed code. For example, the decoding information may include one or more compressed codes for decoding the target frame.

The encoding parameter controls one or more properties of how a target frame is encoded and decoded using the encoder and decoder of the machine-learned compression model. The encoding parameter may relate to, for example, the reconstruction quality or codelength of the target frame or how a target frame is encoded with reference to other frames in the video. In one instance, the encoding parameter is a rate parameter that indicates the desired bitrate of the compressed code for a target frame. The bitrate represents how many bits of information are processed per unit time to transmit the compressed code for the target frame. Thus, a high bitrate indicates that a higher degree of information is used to encode the target frame for a higher reconstruction quality, while a low bitrate indicates that a lower degree of information is used to encode the target frame for a lower reconstruction quality.

In another instance, the encoding parameter is a frame parameter that indicates the type of information used to encode the target frame as a I-frame, a P-frame, or a B-frame. Specifically, a target frame encoded as an I-frame may be encoded and decoded without reference to previously reconstructed frames in the video. On the other hand, a target frame encoded as a P-frame or B-frame may be encoded and decoded with reference to one or more previously reconstructed frames in the video. In particular, a target frame encoded as a P-frame is encoded with respect to changes from a previously reconstructed frame that is placed temporally before or after the target frame in the video. A target frame encoded as a B-frame, on the other hand, is encoded bi-directionally with respect to changes from one or more previously reconstructed frames that are placed temporally before and after the target frame in the video.

In one embodiment, the parameter information for a target frame is represented as a parameter map that is one or more vectors or scalars used to input a desired value for the encoding parameter to the compression model. In one instance, the parameter map is a one-hot encoded vector, where each element in the vector represents a respective value for the encoding parameter. An element in the vector is a non-zero value (e.g., value of one) if it corresponds to the desired value for the encoding parameter for the target frame and zero otherwise. For example, a parameter map may encode five bitrate levels, and be represented by a five-element vector where each element corresponds to a bitrate level. Thus, a parameter map specifying encoding and decoding at a fourth bitrate level may be represented by the vector [0 0 0 1 0]. In one instance, the parameter map may be input to the compression model by concatenating the parameter map to input tensors to the compression model. In another instance, the parameter map is used to select a respective subset of weights of the compression model that are dedicated for a respective value of the encoding parameter represented by the parameter map.

During the training process, the compression system 130 iteratively trains the weights for the compression model by applying the compression model to encoding information and parameter information for the training frame to generate compressed code and a reconstructed version of the training frame. The parameter information for the training frame indicates a respective value for the encoding parameter that the training frame is configured to train for during the training process. The compression system 130 updates weights of the compression model to reduce a loss function. In one instance, the loss function includes a reconstruction loss indicating a difference between the training frame and the reconstructed frame, and a codelength loss indicating the codelength of the compressed code and that depends on the value of the encoding parameter. This process is repeated until a convergence criteria is reached.

By training compression models that incorporate parameter information, the resulting encoders and decoders can address a wide range of values for the encoding parameter by simply specifying the desired value as input to the encoder and the decoder during the deployment process. Responsive to receiving a desired value for a target frame, the encoder of the compression model is trained to output compressed code that when reconstructed by the decoder generates a high-quality reconstructed version of the target frame given the constraints or conditions set by the value of the encoding parameter. Rather than having a separate encoder-decoder for each value of the encoding parameter that may lead to inefficient and slow memory loading and unloading, information can be encoded and decoded for different values of the encoding parameter with significant weight sharing within the compression model. This allows for efficient encoding and decoding of information during deployment.

In one embodiment, the compression system 130 may train multiple compression model architectures that correspond to multiple types of encoder-decoders. Each compression model may differ in the type of information and method used for encoding and decoding. In one instance, the compression system 130 may train multiple compression models depending on whether the encoder-decoder is used to encode and decode a I-frame, a P-frame, or a B-frame. For example, the compression system 130 may train a compression model to encode and decode I-frames that are encoded without reference to previously reconstructed frames. In such an example, the encoder includes an encoding system coupled to receive encoding information including a target frame and parameter information for the target frame and generate compressed code. The decoder includes a decoding system coupled to receive decoding information including the compressed code and the parameter information and generate a reconstructed frame of the target frame.

The compression system 130 may train another compression model to encode and decode P-frames and B-frames that are encoded with reference to one or more previously reconstructed frames. In such an example, the encoder may include both the encoding system and the decoding system. The encoding system is coupled to receive encoding information including a target frame and previously reconstructed frames and parameter information for the target frame and generate compressed code. The decoding system is coupled to receive decoding information including the compressed code and information obtained from the previously reconstructed frames and parameter information and generate the reconstructed version of the target frame. The decoder includes the decoding system. The reconstructed target frame is then used as the previously reconstructed frame for encoding and decoding the next frame in the video. The compression system 130 may provide encoder-decoders to the sender system 110 and the receiver system 140 after the training process is completed.

The sender system 110 is a system for encoding information using an encoder. The sender system 110 may receive the components of the encoder from the compression system 130 after the training process of the compression model. The sender system 110 provides the encoded information to the receiver system 140. For example, the sender system 110 may be a server of a video streaming website that streams video content to users. The encoded information may be transmitted in the form of a bitstream that is a sequence of bits. The receiver system 140 decodes the bitstream to reconstruct the encoded information using a decoder. For example, the receiver system 140 may be a client device of a user of the video streaming service that reconstructs one or more videos from the sender system 110. The receiver system 140 may receive the components of the decoder from the compression system 130.

During deployment, the sender system 110 encodes a set of frames in a video by applying the encoder to encoding information and parameter information for the frames in the video to generate compressed code that can be used by the decoder to reconstruct the frames of the video. Specifically, for a target frame in the video, the sender system 110 determines a respective value of the encoding parameter for the target frame. The sender system 110 applies the encoder to encoding information and parameter information for the target frame to generate compressed code. In some instances, for example, when the target frame is encoded as a P-frame or a B-frame, the sender system 110 further generates the reconstructed version of the target frame. The reconstructed frame is used as the previously reconstructed frame and as the encoding information for the next frame in the video.

In one instance, the sender system 110 assigns the respective value of the encoding parameter to each target frame based on any encoding constraints that the sender system 110 is subject to. For example, the sender system 110 may be required to transmit a video within a total file size. The sender system 110 may allocate the desired bitrates for the frames such that the total file size of the transmitted bits is within this constraint. The sender system 110 specifies the parameter information for a target frame according to the allocated bitrate level for each target frame.

The receiver system 140 receives the compressed code from the sender system 110 and decodes the set of frames for the video by applying the decoder to decoding information and parameter information for the frames in the video. Specifically, for a target frame in the video, the receiver system 140 may receive information in the transmitted information regarding the respective value of the encoding parameter the target frame was encoded with. The receiver system 140 applies the decoder to decoding information and parameter information for the target frame to generate the reconstructed version of the target frame. In some instances, for example, when the target frame is encoded as a P-frame or a B-frame, the reconstructed target frame is used as the previously reconstructed frame and as the decoding information for the next frame in the video.

FIG. 1B is a block diagram of a system environment 100B including a sender system 110 and a receiver system 140, in accordance with another embodiment. The system environment 100B shown in FIG. 1B includes the sender system 110, the receiver system 140, and additionally an encoded information data store 150 that can be used to store encoded information.

In the system environment 100B of FIG. 1B, the sender system 110 encodes information and stores the encoded information in a data store 150. The receiver system 140 may retrieve the encoded information from the data store 150 to decode and reconstruct the original information. The data store 150 may represent electronic storage in the form of magnetic disks, optical disks, RAM disk, analog disks, non-volatile memory, volatile memory, and the like. The electronic storage may be a standalone storage device, or may be electronic storage integrated within a device, such as a computer or a camera. For example, responsive to a user recording a video, a sender system 110 within the camera may encode the video and store the encoded video the memory of the camera. Responsive to a request to access the video, the receiver system 140 retrieves the encoded information from memory and decodes the video to present the video to the user.

Training and Deployment Process of Compression Model with Parameter Map

Figure 2:
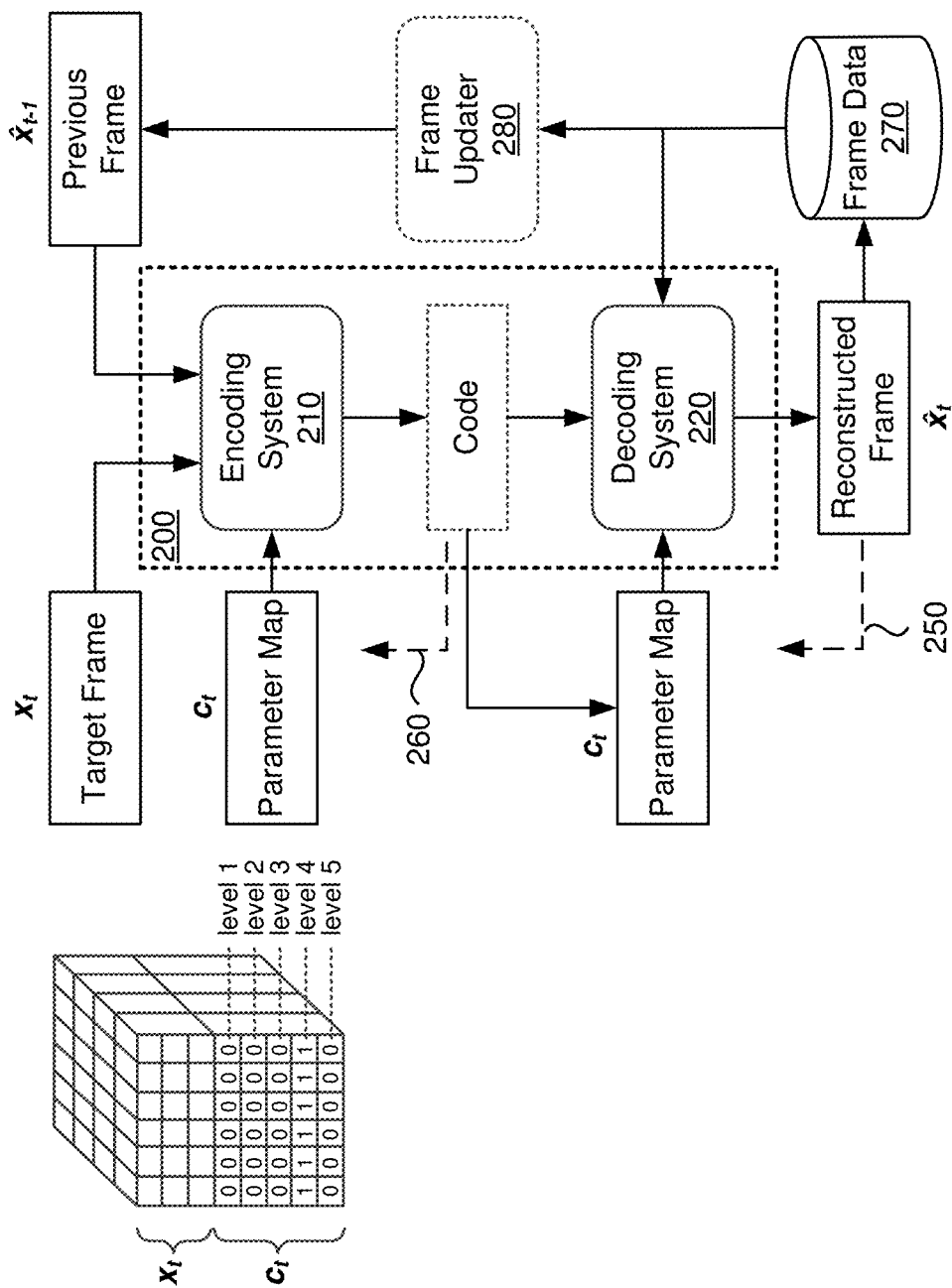
FIG. 2 illustrates a training process for a compression model coupled to receive a parameter map for rate parameters, in accordance with an embodiment.

FIG. 2 illustrates a training process for a compression model 200 coupled to receive a parameter map for rate parameters, in accordance with an embodiment. As shown in FIG. 2, the compression model 200 includes an encoding system 210 and a decoding system 220 among other components.

Specifically, the compression model 200 shown in FIG. 2 is configured to process a sequence of data, which can be a sequence of image frames for a video, and a parameter map encoding values for rate parameters to train the parameters of the compression model 200. The compression model 200 may perform one or more iterations at a given timestep, and at each iteration, a target frame may be processed by the compression model 200 to generate a reconstructed frame for the target frame. The outputs of the compression model 200 are used to train the parameters of the compression model 200, such that the components of the compression model 200 can be deployed as an encoder and/or a decoder. While the example compression model 200 shown in FIG. 2 is coupled to process one target frame at a time for ease of explanation, it should be appreciated that in other embodiments, the "target frame" can be a single frame or multiple frames, such as a group of consecutive frames, depending on the data to be encoded and decoded.

Moreover, while FIG. 2 illustrates a general training process of a compression model 200 for ease of explanation, in practice, the compression system 130 may generate and train multiple compression models 200 that each have a different architecture depending on whether the compression model 200 is configured to encode and decode information as I-frames, P-frames, and/or B-frames. As described below with respect to FIGS. 4A-4C, a detailed example architecture of a compression model 200 for processing I-frames is illustrated with respect to FIG. 4A, and a detailed example architecture of a compression model 200 for processing P-frames or B-frames are illustrated with respect to FIGS. 4B and 4C. However, it is appreciated that in other embodiments, the compression model 200 may incorporate any other type of architectures that can be configured to receive a parameter map specifying values for encoding parameters.

The encoding system 210 of a compression model 200 shown in FIG. 2 is coupled to receive encoding information and the parameter information in the form of a parameter map and generate compressed code. In one embodiment, the encoding information includes image data for the target frame. The decoding system 220 is coupled to receive decoding information and the parameter map and generate a reconstructed version of the target frame. The decoding information includes the compressed code for the target frame. The target frame is encoded into the compressed code such that the compressed code is reconstructed by the decoding system 220 subject to the conditions encoded in the value of the encoding parameter in the parameter map.

In one implementation, the compressed code output by the encoding system 210 is generated at a codelayer that is a bottleneck layer with lower dimensionality (or lower number of nodes) than the remaining layers of the encoding system 210 and the decoding system 220. A compressed code generated at a codelayer may be generated by applying a set of weights of the encoding system 210. In particular, the compression model 200 may be structured such that compressed codes for at least two target frames with different values of the encoding parameter are generated at the same codelayer by applying a same subset of weights in the encoding system 210. Since the compression model 200 is configured to receive values of the encoding parameter as a parameter map, the compressed codes for target frames with different encoding parameter values can be generated at the same codelayer instead of, for example, having separate codelayers for each bitrate level.

In another embodiment, when encoding and decoding is performed with reference to previously reconstructed frames, the encoding information may include image data from one or more previously reconstructed frames in addition to the image data for the target frame. The decoding information may include information obtained from the one or more previously reconstructed frames in addition to the compressed code. Specifically, the encoding information and the decoding information may be represented as tensors that are input to various components of the encoding system 210 and the decoding system 220, respectively.

In one embodiment, the parameter map is encoded into the compressed code, and the decoding system 220 extracts the parameter map from the compressed code. However, embodiments are not limited hereto, and the parameter information can be used by the compression model 200 to encode and decode by other configurations. For example, in another embodiment, the parameter map may be provided only to the encoding system 210 and not to the decoding system 220. In yet another embodiment, the parameter map may be determined in advance by the decoding system 220, or it may be derived from previously reconstructed frames and therefore, the parameter map does not need to be encoded in the compressed code for the decoding system 220 to obtain that information. In another embodiment, the decoding system 220 is configured to predict the parameter map for a target frame from previously reconstructed frames and the delta between the actual parameter map and the predicted parameter map may be included in the compressed code.

In the example compression model 200 shown in FIG. 2, the parameter map encodes different bitrate levels for the compressed code. As an example, the parameter map may be represented by a one-hot encoded vector with five elements to encode five levels, where a higher level corresponds to a higher bitrate. As described in conjunction with FIGS. 1 and 1B, the bitrate represents how many bits of information are processed per unit time to transmit the compressed code for the target frame. Thus, a bitrate level may represent a target codelength for the compressed code, and a high bitrate level may correspond to a longer codelength, while a low bitrate level may correspond to a shorter codelength for the compressed code.

In one instance, the parameter map may be input to the compression model 200 by tiling and concatenating the parameter map to elements of an input tensor and inputting the concatenated tensor to respective components of the compression model 200. For example, the encoding system 210 may be coupled to receive encoding information and parameter information in the form of a concatenated target frame and one or more concatenated reconstructed frames. The concatenated target frame may be a tensor having the parameter map concatenated to the image data for the target frame. In another embodiment, the parameter maps of the previously reconstructed frames may be optionally input to the compression model 200. In yet another instance, the parameter map may be input to the compression model 200 as a separate tensor instead of being concatenated to another tensor.

In one embodiment, one or more of the components the compression model 200 are configured as neural network architectures, such as artificial neural networks (ANN), convolutional neural networks (CNN), deep neural networks (DNN), recurrent neural networks (RNN), long short-term memory (LSTM) networks, transformer networks, and the like. Specifically, any part of the encoding system 210 and the decoding system 220 may be configured as any of these neural network models. In one embodiment, the encoding system 210 and the decoding system 220 may be configured as autoencoders described in U.S. patent application Ser. No. 15/844,424, U.S. patent application Ser. No. 15/844,449, 15/844,447, or 15/844,452, all of which are incorporated by reference herein in their entirety.

During the training process, the compression system 130 obtains a set of training videos. Each training video may include a set of training frames that represent a scene over time. For example, a training video may capture a car moving down a street or a pedestrian walking across a sidewalk. The training videos may differ with each other with respect to the content included in the videos. In one instance, when the parameter map represents bitrate levels, the compression system 130 may assign a bitrate level to each training frame. The bitrate levels may be assigned randomly to each frame or according to some predetermined criterion by the compression system 130. The compression system 130 may also assign a frame label to each training frame indicating whether the training frame is to be processed as an I-frame, a P-frame, or a B-frame, such that a compression model 200 with the appropriate architecture can be applied to each training frame according to the frame label.

Returning to FIG. 2, during the training process, the compression model 130 iteratively alternates between performing a forward pass step and a backpropagation step for training frames in a video. Specifically, during the forward pass step for a t-th iteration, the compression system 130 applies the encoding system 210 to encoding information and the parameter map $c_t$ for a target frame $x_t$ in a training video to generate compressed code. The encoding information may include the target frame $x_t$ and/or one or more previously reconstructed frames $\hat{x}_{t-1}$. In one instance, the compressed code may be further configured to include the parameter map or information obtained from the parameter map when the encoding system 210 is configured to propagate the parameter map to the decoding system 220 via the compressed code. The compression system 130 applies the decoding system 220 to decoding information and the parameter map for the target frame $x_t$ to generate the reconstructed version of the target frame $\hat{x}_t$. The decoding information may include the compressed code and information obtained from the previously reconstructed frames $\hat{x}_{t-1}$.

In the example shown in FIG. 2, the parameter map $c_t$ indicates that the bitrate level for the target frame $x_t$ is the fourth bitrate level and is represented by the vector [0 0 0 1 0]. The parameter map $c_t$ is tiled and concatenated to the RGB image data tensor for the target frame $x_t$. The parameter map $c_t$ can also be tiled and concatenated to other input tensors that are generated within the compression model 200. However, the parameter map in FIG. 2 is just one implementation of how parameter information can be incorporated in the compression model 200, and it is appreciated that the parameter information can be represented in other types of formats or data structures. For example, in another embodiment, the parameter map may be provided as a scalar number instead of a one-hot encoded vector. As another example, as described in more detail below in conjunction with the section titled "Bitrate Level Interpolation," the parameter information may be an arbitrary vector or a number which is then used to interpolate one-hot encoded vectors. The compression system 130 may store the reconstructed frame $\hat{x}_t$ for the target frame in a frame data store 270. If necessary, a frame updater 280 may retrieve the reconstructed frame $\hat{x}_t$ from the frame data store 270 to use as the previously reconstructed frame for a next frame in the video.

The compression system 130 determines a loss function based on the results of the forward pass step. During the backpropgation step, the compression system 130 backpropagates one or more error terms obtained from the loss function to update the weights of the compression model 200. Specifically, the compression system 130 may update the weights of the neural network portions of the compression model 200. In one instance, the error terms are the gradient of the loss function taken with respect to the weights of the compression model 200, and the weights are updated to reduce the loss function. The compression system 130 repeats the forward pass step and the backpropagation step for multiple iterations using new training frames until a convergence criteria for the weights of the compression model 200 are reached, at which point the training process is completed.

In one embodiment, the loss function includes a combination of a reconstruction loss 250 and a codelength loss 260. The reconstruction loss 250 indicates a difference between target frames $x_t$ and reconstructed frames $\hat{x}_t$, and thus measures the quality of reconstruction. In one instance, the reconstruction loss 250 is given by:

$$\mathcal{L}_r(x_t, \hat{x}_t; \theta) = \frac{1}{T}\sum_T \mu_t^{(l)} D(x_t, \hat{x}_t^{(l)})$$

where l indicates the bitrate level assigned to the target frame $x_t$, $D(\cdot)$ is a distortion metric indicating a difference between the target frame $x_t$ and the reconstructed frame $\hat{x}_t^{(l)}$, $\theta$ indicates the collective set of parameters for the compression model 200, T is the number of frames in a training batch, $\mu_t$ is a dynamically chosen weight during the training process that emphasizes bitrate levels that need higher training accuracy, and $L_r$ indicates the reconstruction loss.

The codelength loss 260 indicates a length of the compressed code generated by the encoding system 210 during the forward pass step. In one instance, the compression system 130 assigns a regularization weight $\lambda^{(l)}$ to each bitrate level l represented in the parameter map, and the codelength loss 260 for a target frame $x_t$ assigned to a bitrate level l is determined as the codelength of the compressed code weighted by the regularization weight $\lambda^{(l)}$ for the bitrate level l. In one instance, the codelength loss 260 is given by:

$$\mathcal{L}_{ent}(x_t, \hat{x}_t; \theta) = \frac{1}{T}\sum_T \lambda_{reg}^{(l)} R_t^{(l)}$$

where $R_t^{(l)}$ is the codelength for the compressed code for target frame $x_t$ assigned to bitrate level l, and $\lambda^{(l)}$ is the regularization weight for the bitrate level l. In particular, the regularization weight $\lambda^{(l)}$ assigned to a bitrate level l may decrease as the bitrate level l increases, and increase as the bitrate level l decreases.

Thus, by reducing a loss function that is a combination of the reconstruction loss 250 and the codelength loss 260, the compression system 130 can train components of the compression model 130 to increase reconstruction quality for the reconstructed frame while reducing the codelength of the compressed code according to a specified bitrate level. Specifically, a target frame $x_t$ assigned to a lower bitrate level will have a higher value of the regularization weight $\lambda^{(l)}$, such that the relative weight of the codelength loss 260 to the reconstruction loss 250 will be higher than a target frame assigned to a high bitrate level. This trains the encoding system 210 to generate compressed codes with shorter codelength while reducing the reconstruction loss 250.

Figure 3:
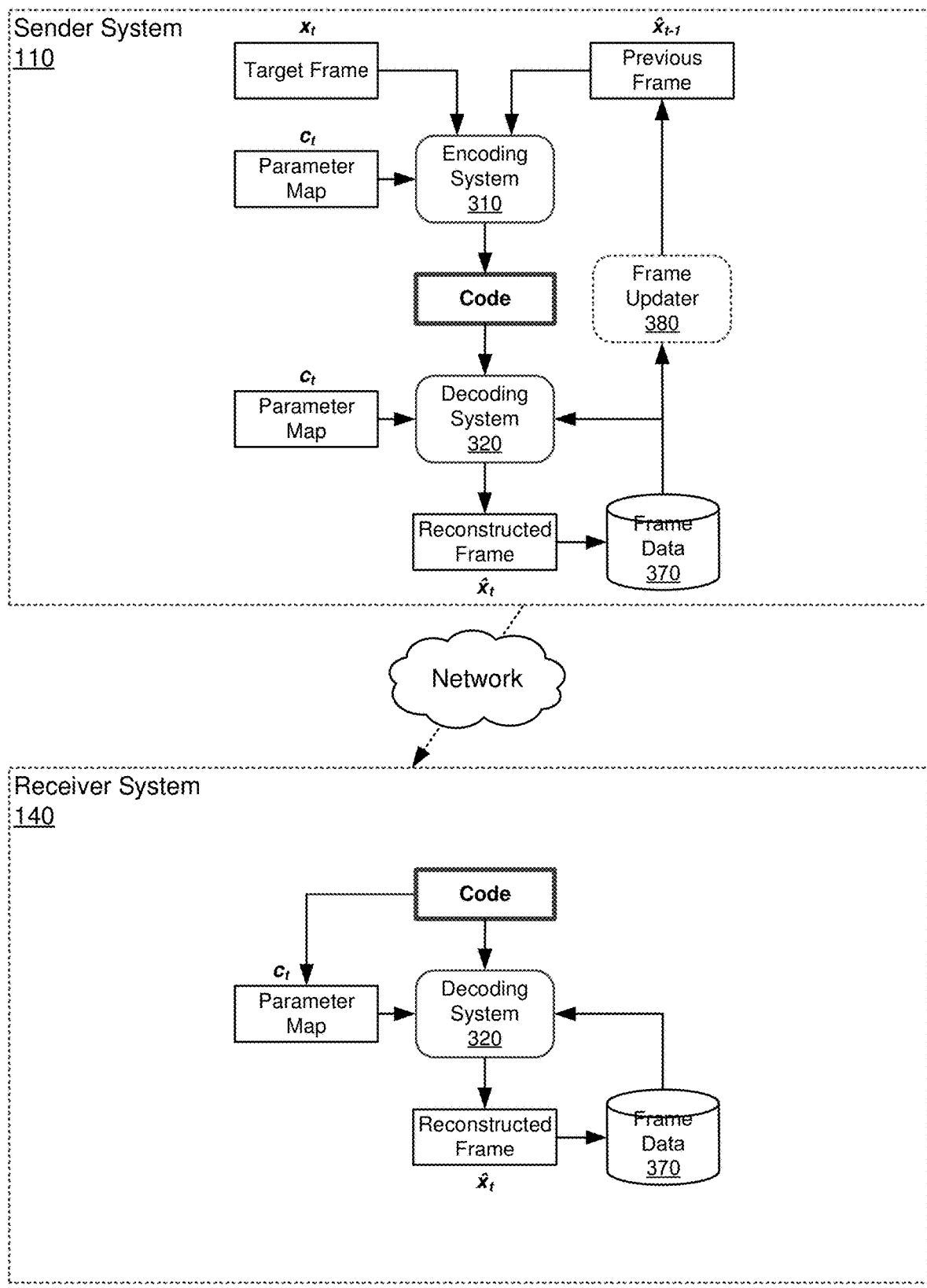
FIG. 3 illustrates a deployment process for the compression model, in accordance with an embodiment.

FIG. 3 illustrates a deployment process for the compression model, in accordance with an embodiment. The compression system 130 provides components of the encoder to the sender system 110 and the components of the decoder to the receiver system 140. In the example shown in FIG. 3, the sender system 110 includes an encoder including a trained encoding system 310 and a trained decoding system 320.

The receiver system 140 includes a decoder including the trained decoding system 320. The components shown in FIG. 3 may be identical or substantially similar to those shown in the compression model 200 of FIG. 2, but may be provided to the sender system 110 and the receiver system 140 by the compression system 130 after the training process of the compression model 200.

During deployment, the sender system 110 iteratively encodes a sequence of image frames for a video using the encoder. Specifically, FIG. 3 illustrates the encoding process for the t-th target frame in a video. The sender system 110 determines a value for the encoding parameter for a target frame. The sender system 110 applies the encoding system 310 to a target frame, one or more previously reconstructed frames, and a parameter map for the target frame to generate compressed code. As described above, the parameter map may be encoded into the compressed code, such that the decoding system can extract the parameter map from the compressed code. The sender system 110 applies the decoding system 320 to the compressed code, information obtained from the one or more previously reconstructed frames, and the parameter map to generate the reconstructed frame. The reconstructed frame is stored in the frame data store 370 and is updated as the previously reconstructed frame for a next frame. The sender system 110 transmits the compressed code (bolded in FIG. 3) to the receiver system 140. This process may be repeated for the next frame onward.

The receiver system 140 iteratively decodes the sequence of images using the transmitted codes from the sender system 110. The receiver system 140 receives the code from the sender system 110. The receiver system 140 applies the decoding system 320 to the compressed code, information obtained from the one or more previously reconstructed frames, and the parameter map to generate the reconstructed frame for the target frame. The parameter map may be extracted from the compressed code. The reconstructed frame is stored in the frame data store 370 and is updated as the previously reconstructed frame for a next frame. The receiver system 140 repeats this process for the next frame as the compressed code for the next frame is transmitted from the sender system 110.

Architecture of Compression Model with Autoencoder

Figure 4A:
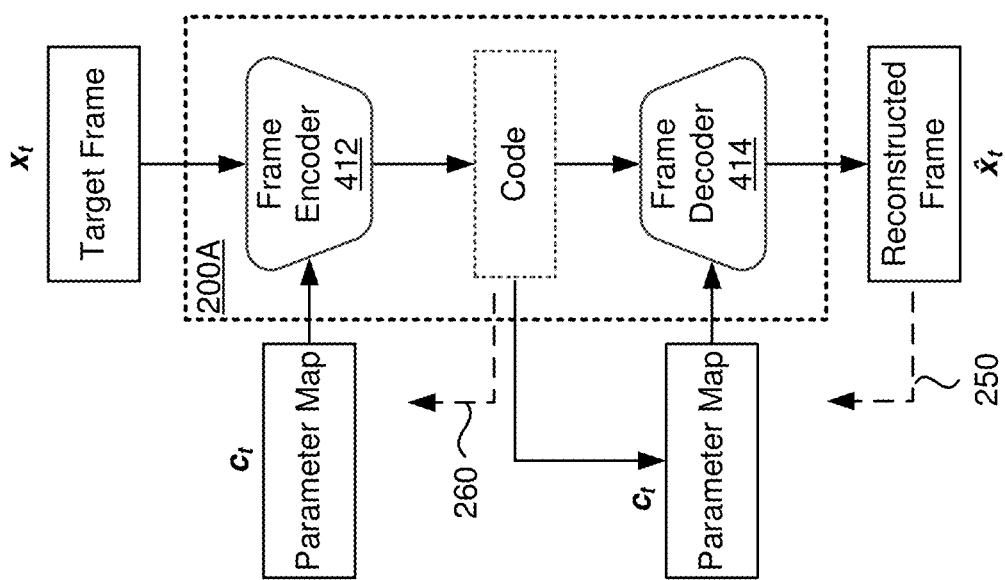
FIG. 4A illustrates a detailed architecture for a compression model for processing I-frames, in accordance with an embodiment.

FIG. 4A illustrates a detailed architecture for a compression model 200A for processing I-frames, in accordance with an embodiment. The compression model 200A shown in FIG. 4A includes a frame encoder 412 and a frame decoder 414. Thus, the encoding system 210 may include the frame encoder 412, and the decoding system 220 may include the frame decoder 414. The frame encoder 412 and the frame decoder 414 may be configured as a neural network model, as described above in conjunction with FIG. 2. The frame encoder 412 is coupled to receive a target frame and a parameter map and generate compressed code. The framed decoder 414 is coupled to receive the compressed code and generate a reconstructed target frame. As previously described with reference to FIG. 2, the compression model 200A shown in FIG. 4A is configured to encode and decode a frame without reference to one or more previously reconstructed frames in the video.

During the forward pass step of the training process, the compression system 130 applies the frame encoder 412 to the target frame $x_t$ and the parameter map for the target frame $x_t$ of a training video to generate the compressed code for the target frame $x_t$. The compression system 130 applies the frame decoder 414 to the compressed code to generate the reconstructed frame $\hat{x}_t$. The compression system 130 determines the reconstruction loss 250 and the codelength loss 260 based on the reconstructed frame $\hat{x}_t$ and the length of the compressed code for the bitrate level assigned to the target frame $x_t$. The compression system 130 backpropagates one or more error terms from the loss function to update the weights of the frame encoder 412 and the frame decoder 414. This process is repeated until a convergence criteria is reached.

After the training process is completed, the compression model 130 may store the components of the encoding system 210 including the frame encoder 412 to a computer storage readable medium as the encoder and provide the encoder to the sender system 110 for deployment. The compression system 130 may store the components of the decoding system 220 including the frame decoder 414 to a computer storage readable medium as the decoder and provide the decoder to the receiver system 140 for deployment.

During the deployment process, the sender system 110 encodes a new frame with a desired compression level by applying the frame encoder 412 to the new frame and the parameter map encoding the desired compression level to generate compressed code. The sender system 110 transmits the compressed code to the receiver system 140. The receiver system 140 receives the compressed code and applies the frame decoder 414 to the compressed code to generate a reconstructed version of the new frame. This process is completed for the next frame in the sequence.

Architecture of Compression Model with Frame and Residue Autoencoder

Figure 4B:
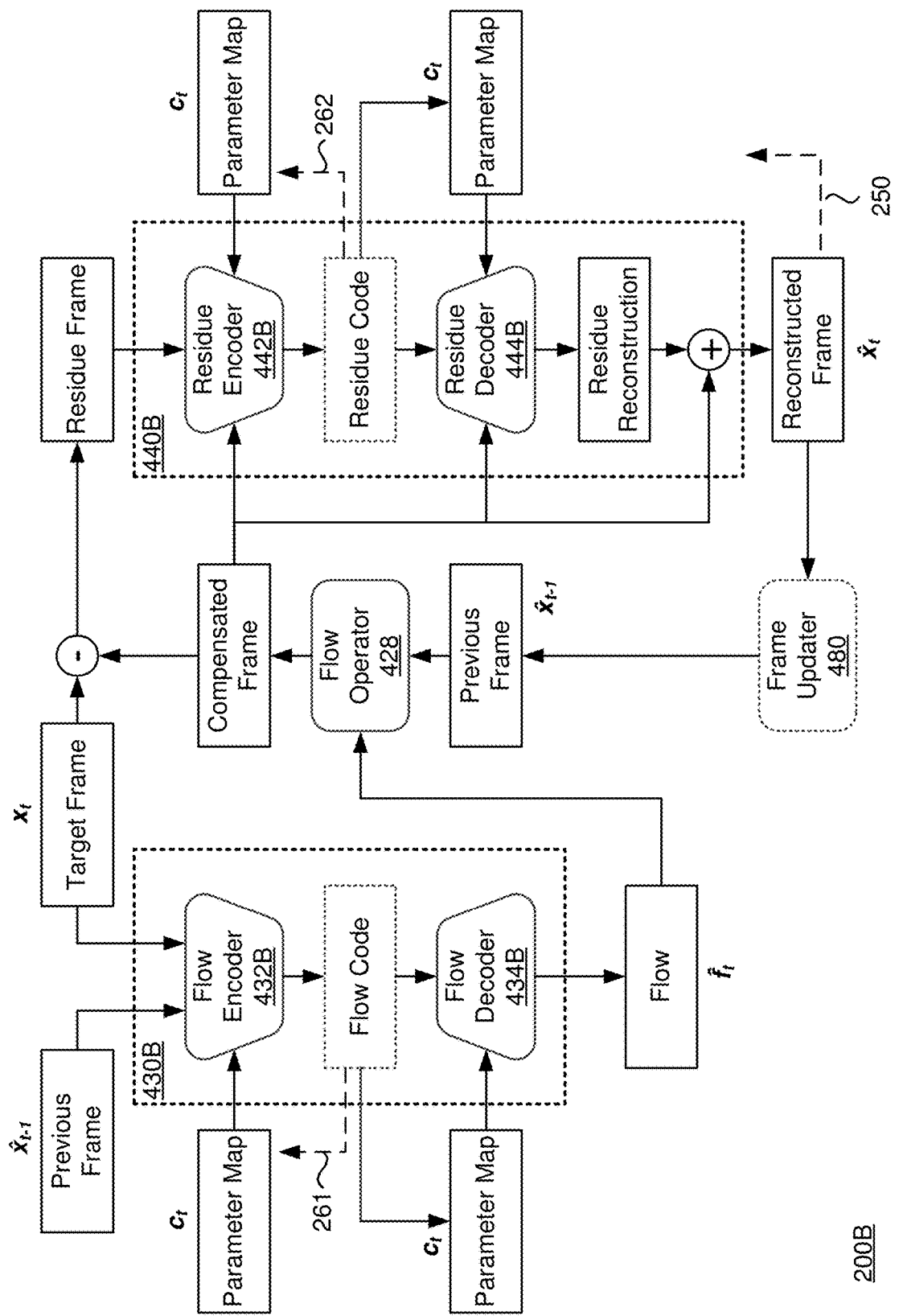
FIG. 4B illustrates a detailed architecture for a compression model for processing P-frames or B-frames, in accordance with an embodiment.

FIG. 4B illustrates a detailed architecture for a compression model 200B for processing P-frames or B-frames, in accordance with an embodiment. One way to encode the target frame in a sequence of video frames is to characterize the target frame as a combination of a flow and a residual frame. The flow describes changes in one or more characteristics of a scene from a previously reconstructed frame to a current target frame. The flow can be applied to the previously reconstructed frame to generate a compensated frame that resembles the target frame but may not include some details of the target frame. Thus, the residual frame describes the residual difference between the target frame and the compensated frame. The encoder may encode the flow and residual frame for a target frame and transmit the compressed information to a decoder, such that the decoder can reconstruct the target frame. This process is repeated for the next frame in the sequence.

For example, the flow may be optical flow that describes the motion displacement of a block of pixels from the previously reconstructed frame to a corresponding block in the current target frame that contains the same portion of the scene (e.g., person riding a motorcycle). The displacement reflects the movement of the portion of the scene from the previously reconstructed frame to the target frame. In such an instance, the flow may be represented in the form of a motion vector that indicates the direction and magnitude of the change from the previously reconstructed frame to the target frame. The compensated frame is generated by displacing each block in the previously reconstructed frame based on the motion vectors, and the residual frame is generated by computing a difference between the compensated frame and the target frame.

The compression model 200B shown in FIG. 4B is configured to encode and decode a target frame with reference to one or more previously reconstructed frames. In one instance, when the target frame is processed as a P-frame, the one or more previously reconstructed frames may include a previously reconstructed frame that is placed temporally before the target frame in the video. For example, the previously reconstructed frame may be a frame that was reconstructed immediately before the target frame that is placed immediately before the target frame in the video. In another instance, when the target frame is processed as a B-frame, the one or more previously reconstructed frames may include two or more previously reconstructed frames that include at least one frame that is placed temporally before, and another frame that is placed temporally after the target frame in the video.

In one embodiment, the compression model 200B includes a flow autoencoder 430B, a flow operator 428, and a residue autoencoder 440B. In particular, the encoding system 210 may include the flow autoencoder 430B and the residue autoencoder 440B. The decoding system 220 may include the flow decoder 434B and the residue decoder 444B. The flow autoencoder 430B includes a flow encoder 432B and a flow decoder 434B. The flow encoder 432B is coupled to receive a target frame, the zero or more previously reconstructed frames, and the parameter map for the target frame and generate the flow code. Similar to the description in FIG. 2, the flow code output by the flow encoder 432B may be generated at a codelayer that is a bottleneck layer with lower dimensionality (or lower number of nodes) than the remaining layers of the flow encoder 432B and the flow decoder 434B, and structured such that flow codes for at least two target frames with different values of the encoding parameter are generated at the same codelayer by applying a same subset of weights in the flow encoder 432B.

The flow decoder 434B is coupled to receive the flow code and the parameter map and generate a reconstructed version of the flow for the target frame. In other words, information in the flow code can be used to reconstruct the flow for the target frame.

The flow operator 428 is coupled to receive reconstructed flow for the target frame and output a compensated frame by applying the reconstructed flow to one or more previously reconstructed frames. In particular, the flow operator 428 applies the reconstructed flow to the one or more previously reconstructed frames based on the information that the encoder is configured to encode in the flow. For example, when the flow represents motion displacement, the flow operator 428 may displace pixels or blocks of pixels from the previously reconstructed frames to corresponding locations on the predicted frame based on the reconstructed flow.

The residue autoencoder 440B includes a residue encoder 442B and a residue decoder 444B. The residue encoder 442B is coupled to receive a residue frame, a compensated frame, and the parameter map for the target frame and generate a residue code. The residue frame is generated by taking the difference between the target frame and compensated frame. For example, the residue frame may be generated by taking the difference in greyscale or RGB intensity values between the target frame and the compensated frame for pixels at same locations in the compensated frame and the target frame. The residue decoder 444B is coupled to receive the residue code, the compensated frame, and the parameter map for the target frame and generate a residue reconstruction for the target frame. Thus, the residue code is used to reconstruct the residue frame. The residue encoder 442B may be structured such that residue codes for at least two target frames with different values of the encoding parameter are generated at the same codelayer by applying a same subset of weights in the residue encoder 442B. The residue reconstruction is combined with the compensated frame to generate the reconstructed frame for the target frame. Then, the compression system 130 may store the reconstructed frame in the frame datastore 470 and the frame updater 480 may retrieve the reconstructed frame as a previously reconstructed frame for a next frame in the sequence when needed.

Moreover, it should be appreciated that the intermediate data structures within the compression model 200B other than the target frame or the one or more previously reconstructed frames can be represented as multi-dimensional tensors. As described in conjunction with FIG. 2, the parameter map may be input to the components of the compression model 200B in any manner that is appropriate for incorporating parameter information. For example, the parameter map may be input to the residue encoder 442B and the residue decoder 444B by tiling and concatenating the parameter map to elements of the compensated frame and the residue frame or by selecting a respective subset of weights in the residue encoder 442B and residue decoder 444B dedicated to the specified bitrate level for the rate parameter.

During the forward pass step of the training process, the compression system 130 applies the components of the flow autoencoder 430B to the target frame $x_t$, zero or more previously reconstructed frames $\hat{x}_{t-1}$, and the parameter map $c_t$ for the target frame of a training video to generate the flow code for the target frame $x_t$ and the reconstructed flow $\hat{f}_t$ for the target frame $x_t$. The input to the flow autoencoder 430B may optionally include the previous flow. The compression system 130 applies the flow operator 428 to the reconstructed flow $\hat{f}_t$ and the one or more previously reconstructed frames $\hat{x}_{t-1}$ to generate the compensated frame. The compression system 130 determines the residue frame by computing a difference between the target frame $x_t$, and the compensated frame. The compression system 130 applies the components of the residue autoencoder 440B to the residue frame, the compensated frame, and the parameter map $c_t$ to generate the residue reconstruction. The compression system 130 combines the residue reconstruction and the compensated frame to generate the reconstructed frame $\hat{x}_t$ for the target frame $x_t$.

The compression system 130 determines the loss function as a combination of the reconstruction loss 250 and the codelength loss 260 based on the reconstructed frame $\hat{x}_t$ and the compressed code generated for the target frame $x_t$. In particular, the codelength $R_t^{(l)}$ of the compressed code for a target frame $x_t$ may be a combination of the codelength of the flow code and the codelength of the residue code generated for the target frame $x_t$. The compression system 130 backpropagates one or more error terms from the loss function to update the weights of the flow encoder 432B, the flow decoder 434B, the residue encoder 442B, and the residue decoder 444B. This process is repeated until a convergence criteria is reached.

After the training process is completed, the compression model 130 may store the components of the encoding system 210 and the decoding system 220, or the compression model 200B, to a computer storage readable medium as the encoder and provide the encoder to the sender system 110 for deployment. The compression system 130 may store the components of the decoding system 220 including the flow decoder 434B, the residue decoder 444B, and the flow operator 428 to a computer storage readable medium as the decoder and provide the decoder to the receiver system 140 for deployment.

During the deployment process, the sender system 110 encodes a new frame with a desired compression level by applying the flow autoencoder 430B to the new frame and the parameter map encoding the desired compression level to generate flow code and reconstructed flow. The sender system 110 generates the compensated frame and the residue frame for the new frame. The sender system 110 then applies the residue autoencoder 440B to the residue frame, the compensated frame, and the parameter map to generate the residue code and the residue reconstruction, and the reconstructed frame. The reconstructed frame may be stored in a frame data store 270 for use in a next frame in the sequence. The sender system 110 transmits the flow code and the residue code to the receiver system 140.

The receiver system 140 receives the flow code and the residue code. The receiver system 140 applies the flow decoder 434B to the flow code and the parameter map to generate the reconstructed flow. The receiver system 140 generates the compensated frame. The receiver system 140 applies the residue decoder 444B to the residue code, the compensated frame, and the parameter map to generate the residue reconstruction, and the reconstructed frame. The reconstructed frame may be stored in a frame data store 270 for use in decoding a next frame in the sequence. This process is completed for the next frame in the sequence.

Architecture of Compression Model with Flow Predictor

Figure 4C:
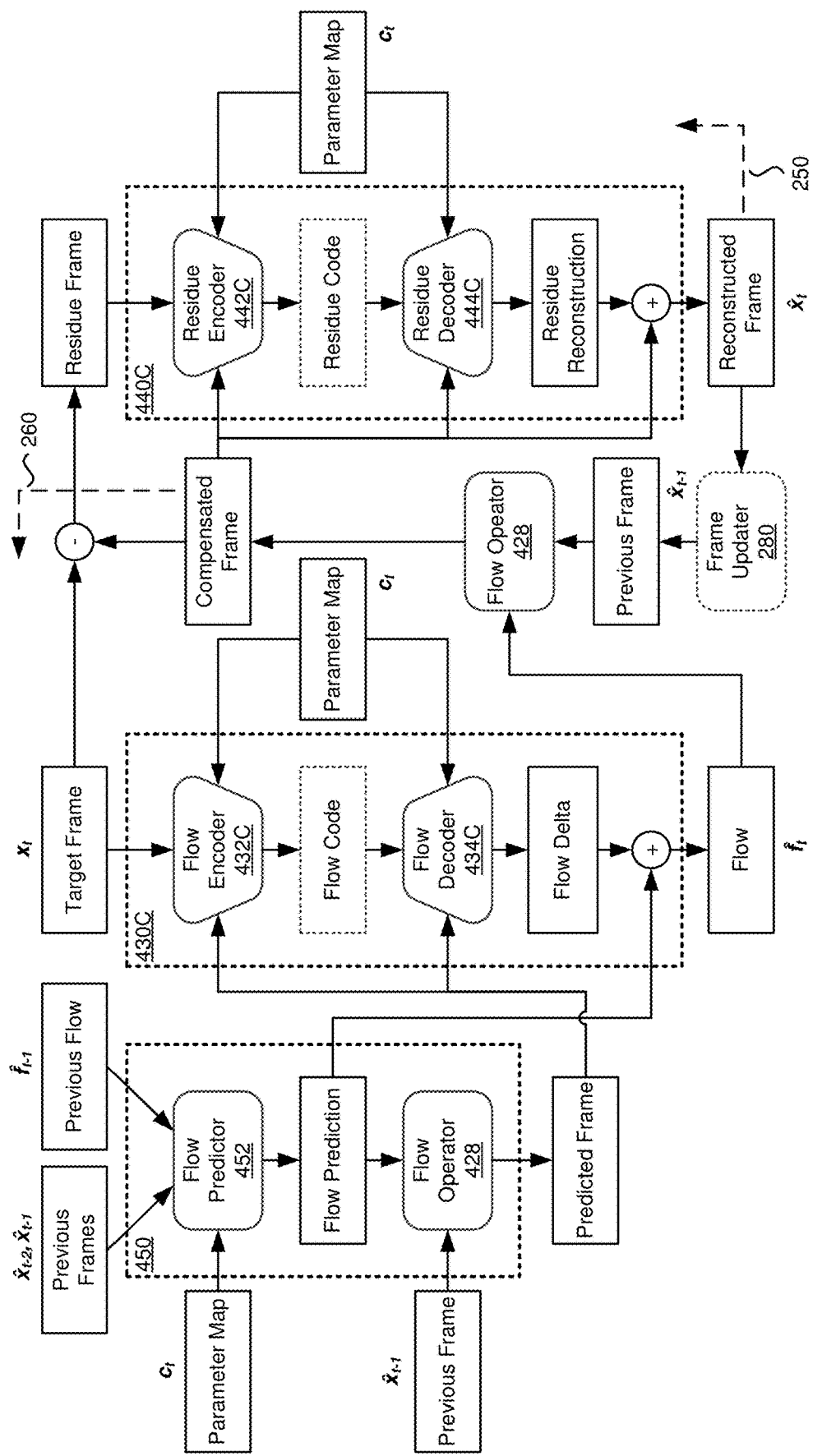
FIG. 4C illustrates a detailed architecture for a compression model for processing P-frames or B-frames, in accordance with another embodiment.

FIG. 4C illustrates a detailed architecture for a compression model 200C for processing P-frames or B-frames, in accordance with another embodiment. The compression model 200C shown in FIG. 2C further includes a flow predictor 450 for predicting the flow of a target frame. Specifically, in many instances, the flow for a set of previously reconstructed frames is a good estimate of the flow for the target frame. This is because changes in a given scene share considerable redundancy. For example, when the flow is optical flow, consecutive frames share redundancy due to the linearity of motion (e.g., constant or similar velocity between frames). For example, the motion vector for a block containing a moving cyclist in a set of previously reconstructed frames may be a good estimate for the motion vector for the target frame because the motion of the cyclist is displaced by similar amounts in one frame to another. Using the flow predictor, the decoder can predict the flow for a target frame to a reasonable accuracy using information already available to the decoder, and the flow for the target frame can be further refined by the flow delta transmitted from the encoder with a smaller number of bits.

In one embodiment, the compression model 200C includes a flow predictor block 450, a flow autoencoder 430C, a flow operator 428, and a residue autoencoder 440C. Specifically, the flow predictor block 450 includes a flow predictor 452 and a flow operator 428. The flow predictor 452 is coupled to receive a set of previous reconstructed frames, a previous flow for the set of previous reconstructed frames, and the parameter map and output the flow prediction for the target frame. The set of previous reconstructed frames may include zero or more frames that were reconstructed before the target frame (e.g., two most recently reconstructed frames), and the previous flow is the flow for these set of previous reconstructed frames. Thus, the flow prediction for a target frame is configured to be generated using information from frames that were already previously reconstructed at that time, rather than content in a current target frame.

The structure and functionality of the flow operator 428 is substantially similar or identical to that described with respect to the flow operator 428 in conjunction with FIG. 4B. The flow 428 is coupled to receive the flow prediction and output a predicted frame by applying the flow prediction to a previously reconstructed frame (e.g., frame reconstructed immediately before). Preferably, when the flow prediction is a reasonably good estimate for the flow for the target frame, the predicted frame already closely resembles the content of the target frame.

The flow autoencoder 430C includes a flow encoder 432C and a flow decoder 434C. The flow encoder 432C is coupled to receive a target frame, the predicted frame, and the parameter map and generate a flow code. The flow decoder 434C is coupled to receive the flow code, the predicted frame, and the parameter map and generate a flow delta for the target frame. The flow encoder 432C may be structured such that flow codes for at least two target frames with different values of the encoding parameter are generated at the same codelayer by applying a same subset of weights in the residue encoder 432C. Thus, information compressed in the flow code can be used to reconstruct the flow delta. The flow delta is used to refine the flow prediction based on the actual content of the target frame to generate the flow for the target frame. In particular, as shown in FIG. 4C, the flow for a target frame is generated by combining the flow prediction with the flow delta.

The residue autoencoder 440C includes a residue encoder 442C and a residue decoder 444C. The residue encoder 442C is coupled to receive a residue frame, a compensated frame, and the parameter map and generate a residue code. The residue encoder 442C may be structured such that residue codes for at least two target frames with different values of the encoding parameter are generated at the same codelayer by applying a same subset of weights in the residue encoder 442C. The compensated frame is generated by the flow operator 428 coupled to receive the flow for the target frame and output a compensated frame by applying the flow to the previously reconstructed frame. The residue frame is generated by computing the difference between the target frame and the compensated frame, similar to that described in conjunction with FIG. 4B.

The residue decoder 444C is coupled to receive the residue code, the compensated frame, and the parameter map and generate a residue reconstruction for the target frame. Specifically, information compressed in the residue code can be used to reconstruct the residue frame. The residue reconstruction can be combined with the compensated frame to generate the reconstructed frame for the target frame. Then, the compression system 130 may store the reconstructed frame in the frame datastore 270 and the frame updater 480 may retrieve the reconstructed frame as a previously reconstructed frame for a next frame in the sequence when needed. The flow for the target frame may also be updated as the previous flow for the next frame in the sequence via a flow updater (not shown in FIG. 4C).

Similar to the compression model 200B in FIG. 4B, it should be appreciated that intermediate data structures within the compression model 200C other than the target frame or the one or more previously reconstructed frames can be represented as multi-dimensional tensors, and the parameter map may be input to the components of the compression model 200B in any manner that is appropriate for incorporating parameter information. For example, the parameter map may be input to the flow predictor 452 by tiling and concatenating the parameter map to elements of the set of previous frames and the previous flow tensors or selecting a respective subset of weights in the flow predictor 452. The parameter map may be input to the flow encoder 432C and the flow decoder 434C by tiling and concatenating the parameter map to elements of the target frame and the predicted frame or passed as a separate tensor. The parameter map may be input to the residue encoder 442C and the residue decoder 444C by tiling and concatenating the parameter map to elements of the residue frame and the compensated frame or can be passed as a separate tensor.

During the forward pass step of the training process, the compression system 130 applies the components of the flow predictor block 450 to the target frame $x_t$, a set of previous reconstructed frames $\hat{x}_{t-2}$, $\hat{x}_{t-1}$, and the parameter map $c_t$ for the target frame to generate a flow prediction. The compression system 130 applies the flow operator 428 to the flow prediction and one or more previously reconstructed frames $\hat{x}_{t-1}$ to generate a predicted frame. The compression system 130 applies the flow autoencoder 430C to the target frame $x_t$, the predicted frame, and the parameter map $c_t$ for the target frame to generate the flow code and the flow delta for the target frame $x_t$ to generate the reconstructed flow $\hat{f}_t$. The compression system 130 applies the flow operator 428 to the reconstructed flow $\hat{f}_t$ and the one or more previously reconstructed frames $\hat{x}_{t-1}$ to generate the compensated frame. The compression system 130 determines the residue frame by computing a difference between the target frame $x_t$, and the compensated frame. The compression system 130 applies the components of the residue autoencoder 440C to the residue frame, the compensated frame, and the parameter map $c_t$ to generate the residue reconstruction. The compression system 130 combines the residue reconstruction and the compensated frame to generate the reconstructed frame $\hat{x}_t$ for the target frame $x_t$.

The compression system 130 determines the loss function as a combination of the reconstruction loss 250 and the codelength loss 260 based on the reconstructed frame $\hat{x}_t$ and the compressed code generated for the target frame $x_t$. In particular, similar to the compression model 200B shown in FIG. 4B, the codelength $R_t^{(l)}$ of the compressed code may be a combination of the codelength of the flow code and the codelength of the residue code generated for the target frame $x_t$. The compression system 130 backpropagates one or more error terms from the loss function to update the weights of the flow predictor 452, the flow encoder 432C, the flow decoder 434C, the residue encoder 442C, and the residue decoder 444C. This process is repeated until a convergence criteria is reached.

After the training process is completed, the compression model 130 may store the components of the encoding system 210 and the decoding system 220, or the compression model 200C, to a computer storage readable medium as the encoder and provide the encoder to the sender system 110 for deployment. Similarly, the compression system 130 may store the components of the decoding system 220 including the flow predictor block 450, the flow decoder 434C, the residue decoder 444C, and the flow operator 428 to a computer storage readable medium as the decoder and provide the decoder to the receiver system 140 for deployment.

During the deployment process, the sender system 110 encodes a new frame with a desired compression level by applying the flow predictor block 450 to a set of previous reconstructed frames, the previous flow, and the parameter map to generate a flow prediction and a predicted frame. The sender system 110 applies the flow autoencoder 430C to a new frame and the parameter map encoding the desired compression level to generate flow code, the flow delta, and the reconstructed flow. The sender system 110 generates the compensated frame and the residue frame for the new frame. The sender system 110 then applies the residue autoencoder 440C to the residue frame, the compensated frame, and the parameter map to generate the residue code and the residue reconstruction, and the reconstructed frame. The reconstructed frame may be stored in a frame data store 270 for use in a next frame in the sequence. The sender system 110 transmits the flow code and the residue code to the receiver system 140.

The receiver system 140 receives the flow code and the residue code. The receiver system 140 applies the flow predictor block 450 to a set of previous reconstructed frames and a previous flow to generate a flow prediction and a predicted frame. The receiver system 140 applies the flow decoder 434C to the flow code and the parameter map to generate the reconstructed flow. The receiver system 140 generates the compensated frame. The receiver system 140 applies the residue decoder 444C to the residue code, the compensated frame, and the parameter map to generate the residue reconstruction, and the reconstructed frame. The reconstructed frame may be stored in a frame data store 270 for use in decoding a next frame in the sequence. This process is completed for the next frame in the sequence.

The description of the compression model 200 in FIG. 2 and example architectures of the compression models 200A, 200B, 200C in FIGS. 4A through 4C are described with respect to parameter maps encoding desired compression levels. However, this is merely an example, and as described in more detail below, it is appreciated that the parameter map may encode values for any other types of encoding parameters. The weights of the compression model 200 may be trained by assigning the specific value of the encoding parameter to training data and inputting the training data along with the parameter map encoding the specific value of the encoding parameter to generate the outputs of the compression model 200. The weights of the compression model 200 are updated based on one or more error terms from a loss function computed using the outputs.

Moreover, in one embodiment, information processed by various components of the compression models 200A, 200B, 200C may be directly interpretable with respect to the types of data it encodes in the context of video encoding and decoding. For example, an element of the flow prediction tensor generated by the flow predictor 452 in FIG. 4C may be interpreted to encode the predicted flow for a respective pixel and in the previously reconstructed frame, and an element in the residue reconstruction tensor generated by the residue decoder 444C in FIG. 4C may be interpreted to encode a residual pixel intensity value for a respective pixel in the target frame. However, it should be appreciated that information processed by the compression model is not limited hereto and can include information that is not readily interpretable in the context of video compression.

Specifically, in another embodiment, at least a part of the information processed by a compression model (e.g., any inputs or outputs of the compression model 200 of FIG. 2, compression model 500 of FIG. 5, or compression model 600 of FIG. 6) is represented as state information that captures and propagates information used by a neural network component to perform an assigned task. The state information for a neural network component may be uninterpretable in the sense that it can be processed by the neural network component to store and retrieve any type of information necessary for performing the task, rather than having a specific, interpretable meaning on the information. In one instance, the state information is represented as a tensor with one or more spatial dimensions.

In one example, information received or output by a component of the compression model may be configured to be at least in part or entirely composed of state information that is not necessarily associated with an imposed meaning but is used by the component to propagate any type of information that the component deems necessary for performing the assigned task. The component may learn what types of information to place in the state information during the training process. For example, the flow prediction tensor generated by the flow predictor 452 in FIG. 4C may be at least in part or entirely be composed of state information that contains data used by the flow predictor 452 to propagate any type of information that the flow predictor 452 deems necessary for predicting flow. In one instance, when information processed by the component of the compression model is represented as a tensor, at least a portion of the tensor can include interpretable information and the remaining portion of the tensor (e.g., additional channels in the tensor) may be configured as state information. For example, at least a part of the flow delta tensor output by the flow decoder 434C in FIG. 4C may include interpretable elements that encode the flow delta for each respective pixel in a target frame but can also include additional channels of state information that extract and encode information not directly interpretable by a human operator but is still useful to the residue decoder 444C or other components of the compression model 200C for the purpose of encoding and decoding videos.

Bitrate Level Interpolation

The compression model 200 described in conjunction with FIG. 2 configured to receive a parameter map as input allows an encoder-decoder to interpolate between bitrate levels. Specifically, the method of training and deploying the compression model 200 receives a specified bitrate level among a set of bitrate levels as input. For example, in the example shown in FIG. 2, the components of the compression model 200 receive a specified bitrate level among five bitrate levels as input. In one embodiment, the compression system 130 generates a parameter map that when input to the compression model or the corresponding encoder-decoder, generates compressed code for a reconstructed frame that corresponds to an interpolated bitrate level between the set of bitrate levels represented by elements of the parameter map.

In one embodiment, L levels can be embedded into a $L_e$-dimensional space represented by a one-hot encoded vector of a parameter map (e.g., $L_e$ number of elements). Specifically, the parameter map $v_l$ embedding a level $l \in \{0, 1, \ldots L-1\}$ is computed by:

$$s = \frac{l(L_e - 1)}{L - 1}, u = \lfloor s \rfloor, v = u + 1, d_u = s - u, d_v = v - s,$$

$$\alpha = \frac{d_v}{d_u + d_v}, \beta = 1 - \alpha, v_l = \alpha \cdot onehot(u \mid L_e) + \beta \cdot onehot(v \mid L_e)$$

where onehot(a|b) is the b-dimensional one-hot representation of the integer a. Thus, when $L=L_e$, this reduces back to the one-hot encoded representation. For example, for a 9-level bitrate system embedded into a 5-dimensional space, a value of [0 0 0 0.5 0.5] would correspond to a bitrate level of 7, when zero-based indexing is used.

During deployment, the sender system 110 encodes a new frame with a desired bitrate level $l \in \{0, 1, \ldots, L-1\}$ that is between the $L_e$ bitrate levels encoded by the elements of the parameter map by generating an interpolated embedding $v_l$ using the equations above. The sender system 110 applies the encoding system 210 to the new frame and the interpolated parameter map to generate the compressed code. Responsive to receiving the compressed code, the receiver system 140 applies the decoding system 220 to the compressed code and the interpolated parameter map to generate the reconstructed frame. In this manner, an encoder-decoder architecture can encode an arbitrary number of bitrate levels without additional training of the compression model.

Training Process of Compression Model with Spatial Variation

Figure 5:
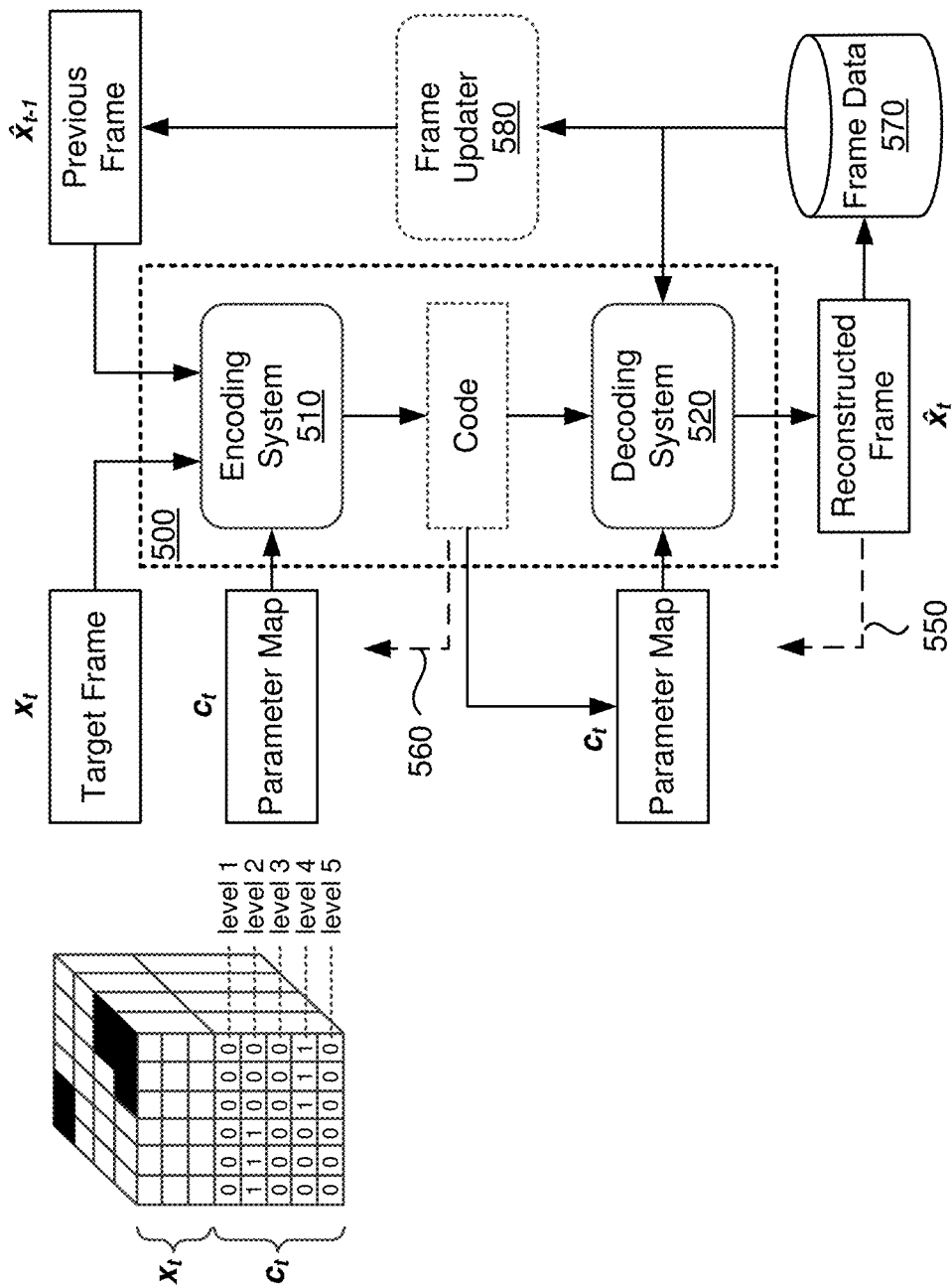
FIG. 5 illustrates a training process for a compression model coupled to receive a parameter map for compression levels with spatial variation, in accordance with an embodiment.

FIG. 5 illustrates a training process for a compression model coupled to receive a parameter map for compression levels with spatial variation, in accordance with an embodiment. As shown in FIG. 5, the compression model 500 includes an encoding system 510 and a decoding system 520 among other components. Specifically, the compression model 500 shown in FIG. 5 is substantially similar or identical to the architecture of the compression model 200 shown in FIG. 2 except that different values of the encoding parameter can be applied to different regions of an input tensor. This is particularly useful if, for example, a target frame includes certain spatial regions that might benefit from the allocation of additional bits for higher quality reconstruction. For example, these spatial regions might be regions including objects-of-interest, such as vehicles, pedestrians, cyclists, and the like. In another embodiment, the spatial regions may be at least in part content-independent. For example, spatial regions near or at the center of a frame may be encoded with higher quality (e.g., higher bitrates), and spatial regions near or at the peripheral areas of the frame may be encoded with lower quality (e.g., lower bitrates). This configuration may be, for example, useful in a virtual reality (VR) setup to match the human visual system's ability to detect at higher resolution objects in the central view. In yet another example, in setups with multiple overlapping cameras, such as cameras for an autonomous driving system, the non-overlapping areas, or areas more likely to contain objects of interest (e.g., other vehicles, pedestrians, cyclists) might be considered more important and encoded with higher quality.

In the example compression model 500 shown in FIG. 5, the parameter map may be represented by a plurality of one-hot encoded vectors. Each encoded vector includes one or more elements each representing a respective bitrate level, where a higher level corresponds to a higher bitrate level. An encoded vector may encode the respective value of the encoding parameter for a corresponding spatial region of an input tensor. For example, each encoded vector may correspond to a respective pixel location in the input tensor, or a group of pixel locations in the input tensor that encompass the region-of-interest. In the example shown in FIG. 5, each one-hot encoded vector has five elements to encode five different bitrate levels.

In one instance, the parameter map is input to the compression model 500 by concatenating the encoded vectors of the parameter map to elements of an input tensor and inputting the concatenated tensor to respective components of the compression model 500. For example, the encoding system 510 may be coupled to receive encoding information and the parameter map in the form of a concatenated target frame and one or more reconstructed frames. The concatenated target frame may be a tensor having each encoded vector of the parameter map concatenated to image data for a particular region of pixels in the target frame that are assigned to the bitrate level of the encoded vector.

In another instance, the parameter map is input to the compression model 500 by selecting a respective subset of weights in the compression model 500 that are dedicated to the value of the encoding parameter indicated in an encoded vector in the parameter map. Specifically, different regions of an input tensor may be applied with different subsets of weights depending on the value of the encoding parameter for the region in the parameter map. For example, some components of the compression model 500 may be configured as a convolutional neural network model (CNN) that include a convolutional filter having weights repeatedly applied to a moving window of pixels of an input tensor. In one instance, the convolutional layer may include a set of convolutional filters each corresponding to a respective bitrate level, and different regions of the input tensor may be applied with different convolutional filters depending on the value of the encoding parameter for the region in the parameter map.

During the training process, the compression system 130 obtains a set of training videos. In particular, the compression system 130 may identify certain regions in the training frames and assign a bitrate level to each region in the frame. For example, the compression system 130 may identify pixels that are objects-of-interest in a training frame and assign encoded vectors with high bitrate levels for these pixels and assign encoded vectors with lower bitrate levels to the remaining regions of the training frame. The compression system 130 may also assign a frame label to each training frame indicating whether the training frame is to be processed as an I-frame, a P-frame, or a B-frame, such that a compression model 500 with the appropriate architecture can be applied to each training frame according to the frame label. Specifically, the compression model 500 may include example architectures that are identical or substantially similar to those shown in the compression models 200A, 200B, 200C of FIGS. 4A through 4C.

During the forward pass step of the training process, the compression system 130 applies the encoding system 510 to encoding information and the parameter map $c_t$ for a target frame $x_t$ in a training video to generate compressed code. Similarly to the description of FIG. 2, the encoding system 510 may be structured such that compressed codes for at least two target frames with different values of the encoding parameter are generated at the same codelayer by applying a same subset of weights in the encoding system 510. The compression system 130 then applies the decoding system 520 to decoding information and the parameter map for the target frame $x_t$ to generate the reconstructed version of the target frame $\hat{x}_t$. In the example shown in FIG. 5, example parameter map vectors are shown for the front row of pixels in the image, in which the left three pixels are associated with a lower bitrate level and the right three pixels (indicated with black shading) are associated with a higher bitrate level. Specifically, the parameter map $c_t$ indicates that the bitrate level for regions of the target frame $x_t$ with black shading are associated with the fourth bitrate level and the encoded vector [0 0 0 1 0] is concatenated to the image data for the pixel locations for these regions. Optionally, the encoded vector may be concatenated to the previously reconstructed frames or other frames that are processed within the compression model. The remaining regions for are associated with a lower second bitrate level, and the encoded vector [0 1 0 0 0] is concatenated to the image data for the remaining pixel locations. The compression system 130 stores the reconstructed frame $\hat{x}_t$ in a frame data store 570. When necessary, a frame updater 580 may retrieve the reconstructed frame $\hat{x}_t$ from the frame data store 570 to use as the previously reconstructed frame for a next frame in the video.

The compression system 130 determines a loss function based on the results of the forward pass step. Similar to the description provided in conjunction with FIG. 2, the loss function may also include a reconstruction loss 550 and a codelength loss 560 that is identical or substantially similar to the reconstruction loss 250 and the codelength loss 260 of the compression model 200. However, in one embodiment, the reconstruction loss 550 for the compression model 500 may be given by:

$$\mathcal{L}_r(x_t, \hat{x}_t; \theta) = \frac{1}{T} \sum_T \sum_{chw} \sum_l w_{t,hw}^{(l)} D\left(x_{t,chw}, \hat{x}_{t,chw}^{(l)}\right)$$

where chw is an index indicating a location of an element in the reconstructed frame, l indicates the bitrate level assigned to an element $x_{t,chw}$ at location chw in the target frame $x_t$, $w_t^{(l)}$ is a weighting parameter assigned to the element at location chw that increases as the bitrate level for the location increases, and $\theta$ indicates the collective set of parameters for the compression model 200, and $L_r$ indicates the reconstruction loss and $D(\cdot)$ is the distortion loss.

During the backpropgation step, the compression system 130 backpropagates one or more error terms obtained from the loss function to update the weights of the compression model 500, and repeats the process until a convergence criteria for the weights of the compression model 500 is reached, at which the training process is completed. By reducing a loss function that is a combination of the reconstruction loss 550 that varies according to the bitrate level for a spatial region in the reconstructed frame, the compression system 130 can train the components of the compression model 500 to increase reconstruction quality for important regions in the target frame while reducing the codelength of the compressed code.

During deployment, the sender system 110 iteratively encodes a sequence of image frames for a video using the encoder. The sender system 110 determines the bitrate levels for different regions of a target frame. The sender system 110 applies the encoding system 510 to a target frame, one or more previously reconstructed frames, and a parameter map for the target frame to generate compressed code. The sender system 110 applies the decoding system 520 to the compressed code, information obtained from the one or more previously reconstructed frames, and the parameter map to generate the reconstructed frame. The reconstructed frame is stored in the frame data store 570 and is updated as the previously reconstructed frame for a next frame. The sender system 110 transmits the compressed code to the receiver system 140. This process may be repeated for the next frame onward.

The receiver system 140 iteratively decodes the sequence of images using the transmitted codes from the sender system 110. The receiver system 140 receives the code from the sender system 110. The receiver system 140 applies the decoding system 520 to the compressed code, information obtained from the one or more previously reconstructed frames, and the parameter map to generate the reconstructed frame for the target frame. As discussed above, in one embodiment, the decoding system 520 can be configured to obtain the parameter map from the compressed code or the parameter map for a target frame may be provided externally or inferred from other parameters available to the decoding system 520, such as previously reconstructed frames. In another embodiment, the decoding system 520 can predict the parameter map for a target frame from previously reconstructed frames and the delta between the actual parameter map and the predicted parameter map may be included in the compressed code. The reconstructed frame is stored in the frame data store 570 and is updated as the previously reconstructed frame for a next frame. The receiver system 140 repeats this process for the next frame as the compressed code for the next frame is transmitted from the sender system 110.

As described above, the compression model 500 may include any of the architectures shown in FIGS. 4A through 4C. For example, the compression model 500 may include the example architecture shown in FIG. 4A. The encoding system 510 may include a frame encoder and the decoding system 520 may include a frame decoder. During the forward pass step, the compression system 130 applies the frame encoder to the target frame $x_t$ and the parameter map for the target frame $x_t$ of a training video to generate the compressed code. The compression system 130 applies the frame decoder to the compressed code to generate the reconstructed frame $\hat{x}_t$. The compression system 130 determines the loss function as a combination of the reconstruction loss 550 and the codelength loss 560 and updates the weights of the compression model 500.

During the deployment process, the sender system 110 encodes a new frame with a desired compression level by applying the frame encoder to the new frame and the parameter map for the new frame to generate compressed code. The sender system 110 transmits the compressed code to the receiver system 140. The receiver system 140 receives the compressed code. The receiver system 140 applies the frame decoder to the compressed code and the parameter map for the new frame to generate the reconstructed version of the new frame. This process is completed for the next frame in the sequence.

The compression model 500 may include the example architecture shown in FIG. 4B. The encoding system 510 may include a flow encoder and a residue encoder, and the decoding system 520 may include a flow decoder and a residue decoder. During the forward pass step, the compression system 130 applies the flow autoencoder to the target frame $x_t$, one or more previously reconstructed frames $\hat{x}_{t-1}$, and the parameter map $c_t$ for the target frame of a training video to generate the flow code for the target frame $x_t$ and the reconstructed flow $\hat{f}_t$ for the target frame $x_t$. The compression system 130 applies the components of the residue autoencoder to the residue frame, the compensated frame, and the parameter map $c_t$ to generate the residue reconstruction. Then, the compression system 130 combines the residue reconstruction and the compensated frame to generate the reconstructed frame $\hat{x}_t$ for the target frame $x_t$. The compression system 130 determines the loss function as a combination of the reconstruction loss 550 and the codelength loss 560 and updates the weights of the compression model 500. This process is repeated until a convergence criteria is reached.

During the deployment process, the sender system 110 encodes a new frame with a desired compression level by applying the flow autoencoder to the new frame and the parameter map to generate flow code and the reconstructed flow. The sender system 110 generates the compensated frame and the residue frame for the new frame. The sender system 110 then applies the residue autoencoder to the residue frame, the compensated frame, and the parameter map to generate the residue code and the residue reconstruction, and the reconstructed frame. The reconstructed frame may be stored in a frame data store for use in a next frame in the sequence of frames. The sender system 110 transmits the flow code and the residue code to the receiver system 140.

The receiver system 140 receives the flow code and the residue code from the sender system 110. The receiver system 140 applies the flow decoder to the flow code and the parameter map to generate the reconstructed flow. The receiver system 140 generates the compensated frame. The receiver system 140 applies the residue decoder to the residue code, the compensated frame, and the parameter map to generate the residue reconstruction. The reconstructed frame is generated by combining the residue reconstruction and the compensated frame. The reconstructed frame is stored in a frame data store for use in decoding a next frame in the sequence. This process is completed for the next frame in the sequence.

The compression model 500 may include the example architecture shown in FIG. 4C. The encoding system 510 may include a flow predictor block, a flow encoder, and a residue encoder, and the decoding system 520 may include the flow predictor block, a flow decoder, and a residue decoder. During the forward pass step, the compression system 130 applies the flow predictor block to a set of previous reconstructed frames $\hat{x}_{t-2}$, $\hat{x}_{t-1}$, a previous flow, and the parameter map $c_t$ to generate a flow prediction. The compression system 130 applies the flow autoencoder to the target frame $x_t$, the predicted frame, and the parameter map $c_t$ to generate the flow code and the flow delta. The flow delta is combined with the flow prediction to generate the reconstructed flow $\hat{f}_t$. The compression system 130 applies the flow operator to the reconstructed flow $\hat{f}_t$ and the one or more previously reconstructed frames $\hat{x}_{t-1}$ to generate the compensated frame. The compression system 130 then applies the residue autoencoder to the compensated frame, the residue frame, and the parameter map $c_t$ for the target frame $x_t$, to generate the residue reconstruction for the target frame $x_t$, as well as the reconstructed frame $\hat{x}_t$. The compression system 130 determines the loss function as a combination of the reconstruction loss 550 and the codelength loss 560 and updates the weights of the compression model 500. This process may be repeated until a convergence criteria is reached.

During the deployment process, the sender system 110 encodes a new frame with a desired compression level by applying the flow predictor block to a set of previous reconstructed frames, the previous flow for the previous reconstructed frames, and the parameter map to generate a flow prediction for the new frame and a predicted frame. The sender system 110 applies the flow autoencoder to a new frame and the parameter map encoding the desired compression level to generate flow code, the flow delta, and the reconstructed flow. The sender system 110 generates the compensated frame and the residue frame. The sender system 110 applies the residue autoencoder to the residue frame, the compensated frame, and the parameter map to generate the residue code and the residue reconstruction, and the reconstructed frame. The reconstructed frame may be stored in a frame data store for use in a next frame. The sender system 110 transmits the flow code and the residue code to the receiver system 140.

The receiver system 140 receives the flow code and the residue code from the sender system 110. The receiver system 140 applies the flow predictor block to a set of previous reconstructed frames and the previous flow to generate a flow prediction for a target frame. The receiver system 140 applies the operator to generate a predicted frame. The receiver system 140 applies the flow decoder to the flow code, the predicted frame, and the parameter map to generate the reconstructed flow. The receiver system 140 applies the operator to generate the compensated frame. The receiver system 140 then applies the residue decoder to the residue code, the compensated frame, and the parameter map to generate the residue reconstruction. The receiver system 140 generates the reconstructed frame by combining the compensated frame and the residue reconstruction. The reconstructed frame is stored in a frame data store for use in decoding a next frame in the sequence. This process is completed for the next frame in the sequence.

It should be appreciated that throughout the training process and the deployment process of the compression model, the parameter map can be applied to different components of the compression model according to respective locations in the target frame that are associated with the encoded vectors of the parameter map. For example, in the architecture of FIG. 4B, the compensated frame and the residue frame may have the same dimensionality as the target frame. The parameter map may be input to the residue encoder and the residue decoder by concatenating the encoded vectors to respective elements of the compensated frame and the residue frame at the same locations as the region of pixels in the target frame that were assigned to these encoded vectors. As another example, the predicted frame in the architecture of FIG. 4C may have the dimensionality as the target frame. The parameter map may be input to the flow encoder and the flow decoder by concatenating the encoded vectors to respective elements of the predicted frame at the same locations as the region of pixels in the target frame that were assigned to these encoded vectors. As another example, the flow encoder and the flow decoder may be configured as a convolutional neural network, and a respective convolutional filter is applied to different regions of the target frame and the predicted frame depending on the selected values of the bitrate levels for these regions.

Training Process of Compression Model with Frame Parameters

Figure 6:
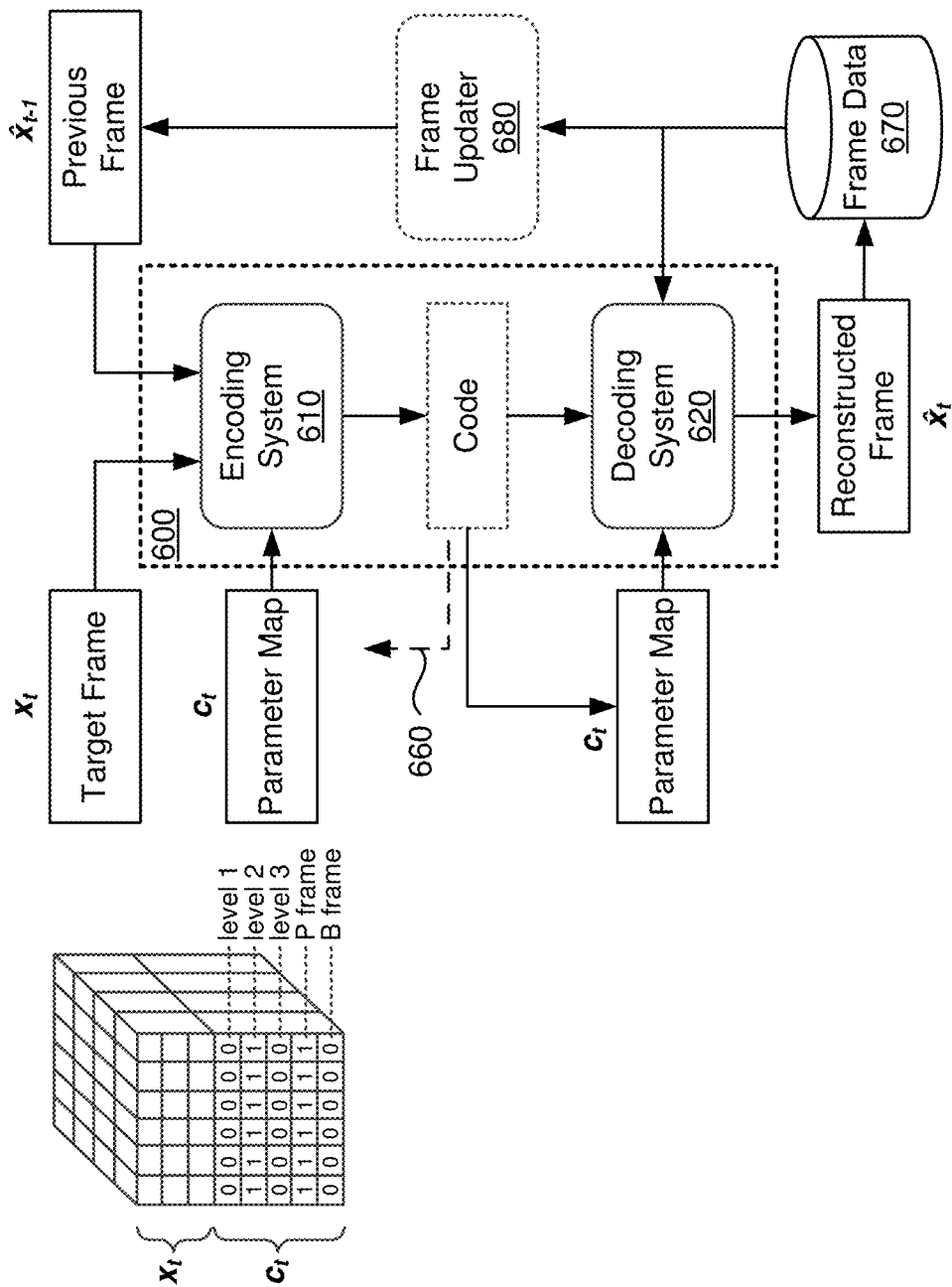
FIG. 6 illustrates a training process for a compression model coupled to receive a parameter map for frame parameters, in accordance with an embodiment.

FIG. 6 illustrates a training process for a compression model coupled to receive a parameter map for frame parameters, in accordance with an embodiment. As shown in FIG. 6, the compression model 600 includes an encoding system 610 and a decoding system 620 among other components. Specifically, the compression model 600 shown in FIG. 6 is substantially similar or identical to the architecture of the compression model 200 shown in FIG. 2 except that the parameter map encodes values for a frame parameter that indicates the type of information used to encode and decode a target frame.

Specifically, a target frame encoded as a P-frame or B-frame may be encoded and decoded with reference to one or more previously reconstructed frames in the video. In particular, a target frame encoded as a P-frame may be encoded by characterizing a target frame with respect to flow from one or more previously reconstructed frames that are placed temporally before the target frame (e.g., placed immediately before the target frame in the video) and the corresponding residue frame. A target frame encoded as a B-frame may be encoded by characterizing a target frame with respect to flow from two or more previously reconstructed frames that are placed temporally before and after the target frame (e.g., placed immediately before and after the target frame in the video) and the corresponding residue frame.

Specifically, a B-frame may be encoded and decoded in a hierarchical manner. For example, a B-frame may be encoded and decoded as a $B_1$-frame, a $B_2$-frame, or a $B_3$-frame. A $B_1$-frame is encoded and decoded using previously reconstructed frames that were reconstructed as an I-frame and/or a P-frame, a $B_2$-frame is encoded and decoded using previously reconstructed frames that include one frame reconstructed as an I-frame or P-frame and another frame reconstructed as a $B_1$-frame, and a $B_3$-frame is encoded and decoded using previously reconstructed frames that were reconstructed as a $B_1$-frame and a $B_2$-frame. Thus, in one embodiment, the parameter map encodes whether a target frame is processed as a P-frame, a $B_1$-frame, a $B_2$-frame, or a $B_3$-frame using the compression model 600. The ability to have multiple rates allows encoding and decoding of different B-frame types (e.g., $B_1$, $B_2$, $B_3$) with a single B-frame compression model that takes as input the rate and frame type in the parameter map. This makes the deployment process easier since multiple models with different sets of parameters do not have to be constructed for each $B_1$, $B_2$, or $B_3$ frame. The parameter map may at least in part incorporate the frame type of the target frame, and in one embodiment, may include at least a first parameter map indicating desired bitrate levels and a second parameter map indicating the frame type of the target frame concatenated to the first parameter map. As an example, the second parameter map may be represented as a one-hot encoded vector including four elements, each representing whether a target frame is encoded and decoded as a P-frame, a $B_1$-frame, a $B_2$-frame, or a $B_3$-frame. As another example, the second parameter map may indicate whether a target frame is encoded and decoded as a P-frame or B-frame.

Similar to the compression model 200 in FIG. 2, in one instance, the parameter map is input to the compression model 600 by tiling and concatenating the parameter map to elements of an input tensor and inputting the concatenated tensor to respective components of the compression model 600, or the parameter map may be input to the compression model 200 by selecting a respective subset of weights in the compression model 600 that are dedicated to the selected value of the encoding parameter indicated in the parameter map. For example, responsive to receiving a parameter map encoding a frame parameter, the encoding system 610 may apply a dedicated subset of weights for the frame parameter value to encoding information for the target frame to generate the compressed code for the target frame. Similarly to the description of FIG. 2, the encoding system 610 may be structured such that compressed codes for at least two target frames with different values of the encoding parameter are generated at the same codelayer by applying a same subset of weights in the encoding system 610.

As discussed above, the parameter map may encode values for multiple encoding parameters, such as the bitrate level and whether the frame is encoded as a P-frame or B-frame. For example, the parameter map may include a first parameter map indicating desired bitrate levels and a second parameter map concatenated to the first parameter map, where the second parameter map indicates whether the frame will be encoded and decoded as a P-frame or B-frame.

During the training process, the compression system 130 obtains a set of training videos. In particular, the compression system 130 may assign a frame label to a training frame indicating whether the training frame is to be encoded and decoded as a P-frame, a $B_1$-frame, a $B_2$-frame, or a $B_3$-frame. Thus, depending on the frame label for each frame in a training video and the type previously reconstructed frames for the frame, the sequence of frames may be encoded and decoded in a particular order different from the actual temporal order of the frames in the corresponding video. In one embodiment, the compression model 600 is configured to process a target frame with respect to flow information from one or more previously reconstructed frames and a residue frame, such as the architecture of the compression models 200B, 200C shown in FIGS. 4B and 4C.

During the forward pass step of the training process, the compression system 130 applies the encoding system 610 to encoding information and the parameter map $c_t$ for the target frame $x_t$ in a training video to generate compressed code. The compression system 130 applies the decoding system 620 to decoding information and the parameter map for the target frame $x_t$ to generate the reconstructed frame $\hat{x}_t$. In the example shown in FIG. 6, the example parameter map $c_t$ includes a first parameter map composed of three elements each corresponding to a bitrate level, and a second parameter map composed of two elements each corresponding to whether the frame will be encoded and decoded as a P-frame or B-frame that is concatenated to the first parameter map. Specifically, in the example shown in FIG. 6, the target frame $x_t$ is encoded for a second bitrate level and encoded and decoded as a P-frame, and the corresponding parameter map [0 1 0 1 0] is concatenated to the image data for target frame $x_t$.

Specifically, the one or more previously reconstructed frames $\hat{x}_{t-1}$ for the target frame $x_t$ includes the type of frames that are specified in the parameter map input to the compression model 600. For example, in the example shown in FIG. 6, since the frame label assigned to the target frame $x_t$ is a P-frame, the one or more previously reconstructed frames $\hat{x}_{t-1}$ may include a previously reconstructed frame that was reconstructed as an I-frame. As another example, when the parameter map specifies that the target frame $x_t$ is processed as a $B_1$-frame, the one or more previously reconstructed frames $\hat{x}_{t-1}$ may include two previously reconstructed frames that were reconstructed as a I-frame and a P-frame. In particular, the reconstructed I-frame may be generated, for example, using a compression model having the architecture of FIG. 4A. The compression system 130 stores the reconstructed frame $\hat{x}_t$ in a frame data store 670. When necessary, a frame updater 680 may retrieve the reconstructed frame $\hat{x}_t$ from the frame data store 670 to use as the previously reconstructed frame for a next frame in the video.

The compression system 130 determines a loss function based on the results of the forward pass step. Similar to the description provided in conjunction with FIG. 2, the loss function may also include a reconstruction loss 650 and a codelength loss 660 that is identical or substantially similar to the reconstruction loss 250 and the codelength loss 260 of the compression model 200. During the backpropgation step, the compression system 130 backpropagates one or more error terms obtained from the loss function to update the weights of the compression model 600, and repeats the process until a convergence criteria for the weights of the compression model 600 is reached, at which the training process is completed.

By reducing a loss function based on reconstructed frames that are generated with respect to the frame labels encoded by the parameter maps, the compression system 130 can train the components of the compression model 600 to perform P-frame and B-frame processing with a shared set of weights. Moreover, the components of the compression model 600 are also trained to allocate resources depending on the frame label of the target frame. For example, a target frame processed as a $B_1$-frame may require a higher number of bits compared to frames processed as $B_2$ or $B_3$ frames in order to have good overall performance of the compression model. Since $B_1$ frames are earlier in the decoding hierarchy than $B_2$ or $B_3$ frames, more frames may use a $B_1$ frame as a reference than $B_2$ or $B_3$ frames. Thus, it may be advantageous to the compression model to allocate more bits to encoding a frame that is used as a reference to more decoded frames. Determining the correct bit allocation is also dependent on the amount of motion in the scene, and thus, there is an advantage to having the rate control handled by a compression model with machine-learned components. For instance, if there is a large amount of motion, it may be less important to allocate more bits to frames earlier in the decoding hierarchy. The compression model 600 may be automatically trained to allocate a higher codelength for compressing a target frame as a $B_1$-frame, at the expense of lowering the codelength for other types of target frames.

During deployment, the rate control is less computationally intensive due to the method of training described above. In one method of encoding, the rate parameter is constant across the video. The training procedure ensures that for a fixed value of the rate parameter, strong rate-distortion (RD) performance averaged across the frames of the video is achieved without additional effort to evaluate the encoder for different values of the rate. Real-world constraints may necessitate additional effort at encoding time. For instance, the encoding phase may seek to achieve the highest quality given a maximum bitrate. In this case, the encoder may need to decrease the rate parameter for certain frames when the bitrate budget is exceeded. Another important constraint to consider is to achieve above a certain quality for all frames. In this case, if the quality drops too low, the encoder may choose to increase the rate parameter so that the quality exceeds the minimum quality threshold.

During deployment, the sender system 110 iteratively encodes a sequence of image frames for a video using the encoder. The sender system 110 determines a value for the encoding parameter for a target frame. The sender system 110 applies the encoding system 610 to a target frame, one or more previously reconstructed frames, and a parameter map for the target frame to generate compressed code. The sender system 110 applies the decoding system 620 to the compressed code, information obtained from the one or more previously reconstructed frames, and the parameter map to generate the reconstructed frame. The reconstructed frame is stored in the frame data store 670 and is updated as the previously reconstructed frame for a next frame. The sender system 110 transmits the compressed code to the receiver system 140. This process may be repeated for the next frame onward.

The receiver system 140 iteratively decodes the sequence of images using the transmitted codes from the sender system 110. The receiver system 140 receives the code from the sender system 110. The receiver system 140 applies the decoding system 620 to the compressed code, information obtained from the one or more previously reconstructed frames, and the parameter map to generate the reconstructed frame for the target frame. In one embodiment, the decoding system 620 can be configured to obtain the parameter map from the compressed code or the parameter map for a target frame may be provided externally or inferred from other parameters available to the decoding system 620, such as previously reconstructed frames. In another embodiment, the decoding system 620 can predict the parameter map for a target frame from previously reconstructed frames and the delta between the actual parameter map and the predicted parameter map may be included in the compressed code. The reconstructed frame is stored in the frame data store 670 and is updated as the previously reconstructed frame for a next frame. The receiver system 140 repeats this process for the next frame as the compressed code for the next frame is transmitted from the sender system 110.

As described above, the compression model 600 may include any of the architectures shown in FIGS. 4A through 4C, in particular the compression models 200B, 200C shown in FIGS. 4B and 4C. For example, the compression model 600 may include the example architecture shown in FIG. 4B. The encoding system 610 may include a flow encoder and a residue encoder, and the decoding system 620 may include a flow decoder and a residue decoder. During the forward pass step, the compression system 130 applies the flow autoencoder to the target frame $x_t$, one or more previously reconstructed frames $\hat{x}_{t-1}$, and the parameter map $c_t$ for the target frame of a training video to generate the flow code for the target frame $x_t$ and the reconstructed flow $\hat{f}_t$ for the target frame $x_t$. The compression system 130 applies the components of the residue autoencoder to the residue frame, the compensated frame, and the parameter map $c_t$ to generate the residue reconstruction. The compression system 130 combines the residue reconstruction and the compensated frame to generate the reconstructed frame $\hat{x}_t$. The compression system 130 determines the loss function as a combination of the reconstruction loss 650 and the codelength loss 660 and updates the weights of the compression model 600. This process is repeated until a convergence criteria is reached.

During the deployment process, the sender system 110 encodes a new frame with a desired compression level by applying the flow autoencoder to the new frame and the parameter map to generate flow code and the reconstructed flow. The sender system 110 generates the compensated frame and the residue frame for the new frame. The sender system 110 then applies the residue autoencoder to the residue frame, the compensated frame, and the parameter map to generate the residue code and the residue reconstruction, and the reconstructed frame. The reconstructed frame may be stored in a frame data store for use in a next frame in the sequence of frames. The sender system 110 transmits the flow code and the residue code to the receiver system 140.

The receiver system 140 receives the flow code and the residue code from the sender system 110. The receiver system 140 applies the flow decoder to the flow code and the parameter map to generate the reconstructed flow. The receiver system 140 generates the compensated frame. The receiver system 140 applies the residue decoder to the residue code, the compensated frame, and the parameter map to generate the residue reconstruction. The reconstructed frame is generated by combining the residue reconstruction and the compensated frame. The reconstructed frame is stored in a frame data store for use in decoding a next frame in the sequence. This process is completed for the next frame in the sequence.

The compression model 600 may include the example architecture shown in FIG. 4C. The encoding system 610 may include a flow predictor block, a flow encoder, and a residue encoder, and the decoding system 620 may include the flow predictor block, a flow decoder, and a residue decoder. During the forward pass step, the compression system 130 applies the flow predictor block to a set of previous reconstructed frames $\hat{x}_{t-2}, \hat{x}_{t-1}$, a previous flow, and the parameter map $c_t$ to generate a flow prediction. The compression system 130 applies the flow autoencoder to the target frame $x_t$, the predicted frame, and the parameter map $c_t$ to generate the flow code and the flow delta. The flow delta is combined with the flow prediction to generate the reconstructed flow $\hat{f}_t$. The compression system 130 applies the flow operator to the reconstructed flow $\hat{f}_t$ and the one or more previously reconstructed frames $\hat{x}_{t-1}$ to generate the compensated frame. The compression system 130 then applies the residue autoencoder to the compensated frame, the residue frame, and the parameter map $c_t$ for the target frame $x_t$, to generate the residue reconstruction for the target frame $x_t$, as well as the reconstructed frame $\hat{x}_t$. The compression system 130 determines the loss function as a combination of the reconstruction loss 650 and the codelength loss 660 and updates the weights of the compression model 600. This process may be repeated until a convergence criteria is reached.

During the deployment process, the sender system 110 encodes a new frame with a desired compression level by applying the flow predictor block to a set of previous reconstructed frames, the previous flow for the previous reconstructed frames, and the parameter map to generate a flow prediction for the new frame and a predicted frame. The sender system 110 applies the flow autoencoder to a new frame and the parameter map encoding the desired compression level to generate flow code, the flow delta, and the reconstructed flow. The sender system 110 generates the compensated frame and the residue frame. The sender system 110 applies the residue autoencoder to the residue frame, the compensated frame, and the parameter map to generate the residue code and the residue reconstruction, and the reconstructed frame. The reconstructed frame may be stored in a frame data store for use in a next frame. The sender system 110 transmits the flow code and the residue code to the receiver system 140.

The receiver system 140 receives the flow code and the residue code from the sender system 110. The receiver system 140 applies the flow predictor block to a set of previous reconstructed frames and the previous flow to generate a flow prediction for a target frame. The receiver system 140 applies the flow operator to generate a predicted frame. The receiver system 140 applies the flow decoder to the flow code, the predicted frame, and the parameter map to generate the reconstructed flow. The receiver system 140 applies the flow operator to generate the compensated frame. The receiver system 140 then applies the residue decoder to the residue code, the compensated frame, and the parameter map to generate the residue reconstruction. The receiver system 140 generates the reconstructed frame by combining the compensated frame and the residue reconstruction. The reconstructed frame is stored in a frame data store for use in decoding a next frame in the sequence. This process is completed for the next frame in the sequence.

Similar to the description provided in conjunction with FIG. 2, the parameter map encoding the frame label may be input to the components of the compression model 600 in a manner that is appropriate for incorporating parameter information. As an example, the parameter map may be input to the residue encoder and the residue decoder by tiling and concatenating the parameter map to elements of the compensated frame and the residue frame or by selecting a respective subset of weights in the residue encoder and residue decoder dedicated to the specified bitrate level for the rate parameter.

Moreover, it is also appreciated that during the training process and the deployment process of the compression model, the compression system 130 can encode and decode a sequence of frames in a video using the appropriate architecture of the compression model or the corresponding encoder-decoder depending on the frame label for each frame. For example, during deployment, the sender system 110 may encode a frame as an I-frame using an encoder generated from the architecture of the compression model 200A shown in FIG. 4A. The sender system 110 may then encode a frame as a P-frame using an encoder generated from the architecture of the compression model 600 in FIG. 6 by specifying the frame label as a P-frame and using the reconstructed version of the I-frame as the previously reconstructed frame. The sender system 110 may then encode a frame as a $B_1$-frame using an encoder generated from the compression model 600 by specifying the frame label as a $B_1$-frame and using the reconstructed version of the I-frame and the P-frame as the previously reconstructed frames The receiver system 140 may iteratively receive the transmitted codes for each of these frames from the sender system 110 as well as the frame label for each target frame, and decode each frame using the appropriate architecture of the corresponding decoder.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of encoding a video including a set of source frames, the method comprising:
    accessing a machine-learned compression model coupled to receive a frame and a parameter map for the frame, and output compressed code at a codelayer and a reconstructed version of the frame, wherein at least a portion of the compression model is configured as a neural network including the codelayer and the compression model is trained by:
        obtaining a video including a set of training frames, each training frame associated with a parameter map that indicates one or more values of an encoding parameter for the training frame, and
        changing weights of the compression model in conjunction with value(s) of the codelayer to reduce a loss function, the loss function including a reconstruction loss that indicates a difference between the set of training frames and reconstructed versions of the set of training frames, and a codelength loss that indicates codelength of a compressed code for the training frames, wherein the loss function changes depending on a value of the encoding parameter for the training frames, and wherein the compressed codes for at least two training frames with different values of the encoding parameter are generated at the same codelayer;
    iteratively performing, for each current frame in the set of source frames:
        obtaining a parameter map for the current frame, and
        applying at least a portion of the machine-learned compression model including the changed weights and codelayer value(s) to the current frame and the parameter map for the current frame to generate compressed code for the current frame; and
    transmitting the compressed codes generated for the set of source frames to a receiver system.

2. The method of claim 1, wherein the one or more values of the encoding parameter represent one or more bitrate levels, and wherein the codelength loss increases when a bitrate level for the training frame increases.

3. The method of claim 2, further comprising:
    performing an interpolation operation to generate the parameter map for the current frame that represents an interpolated value for the encoding parameter between the one or more values of the encoding parameter.

4. The method of claim 2, wherein the machine-learned compression model is further coupled to receive one or more previously reconstructed frames for the frame to generate the compressed code and the reconstructed version of the frame, and wherein the one or more values of the encoding parameter for the training frame further represents:
    (i) whether the training frame will be processed as a P-frame with a previously reconstructed frame that is placed temporally before the training frame in the video,
    (ii) whether the training frame will be processed as a $B_1$-frame with two or more previously reconstructed frames that were processed as a P-frame or an I-frame,
    (iii) whether the training frame will be processed as a $B_2$-frame with a previously reconstructed frame that was processed as a P-frame or an I-frame and another previously reconstructed frame that was processed as a $B_1$-frame, or
    (iv) whether the training frame will be processed as a $B_3$-frame with a previously reconstructed frame that was processed as a $B_1$-frame and another previously reconstructed frame that was processed as a $B_2$-frame.

5. The method of claim 1, wherein the compression model is further configured to include the parameter map in the compressed code for a decoder at the receiver system configured to obtain the parameter map from the compressed code.

6. The method of claim 1, wherein the portion of the machine-learned compression model includes one or more subsets of weights, each subset of weights associated with a respective value for the encoding parameter, and wherein applying the portion of the machine-learned compression model to the current frame and the parameter map for the current frame further comprises selecting a respective subset of weights associated with a value for the encoding parameter for the current frame, and applying the respective subset of weights to the current frame, and wherein the compressed codes for at the least two training frames with different values of the encoding parameter generated at the same codelayer are generated by applying the same subset of the changed weights in the compression model.

7. The method of claim 1, wherein the machine-learned compression model includes a flow autoencoder and a residue autoencoder, and applying the portion of the machine-learned compression model to the current frame and the parameter map for the current frame further comprises:
    obtaining zero or more previously reconstructed frames for the current frame,
    applying the flow autoencoder to the current frame, the zero or more previously reconstructed frames, and the parameter map for the current frame to generate flow code as a part of the compressed code and a reconstructed flow for the current frame,
    generating a compensated frame by applying a flow operator to the one or more previously reconstructed frames and the reconstructed flow,
    generating a residue frame by computing a difference between the current frame and the compensated frame,
    applying the residue autoencoder to the compensated frame and the residue frame to generate residue code as another part of the compressed code and a reconstructed residue frame, and
    generating a reconstructed version of the current frame by combining the reconstructed residue frame and the compensated frame.

8. The method of claim 1, wherein the machine-learned compression model includes a flow predictor portion, a flow autoencoder, and a residue autoencoder, and applying the portion of the machine-learned compression model to the current frame and the parameter map for the current frame further comprises:
    obtaining one or more previously reconstructed frames for the current frame,
    applying the flow predictor portion to the one or more previously reconstructed frames or previous flow for the one or more previously reconstructed frames to generate a flow prediction for the current frame, generating a predicted frame by applying a flow operator to the one or more previously reconstructed frames and the flow prediction, applying the flow autoencoder to the current frame and the predicted frame, and the parameter map for the current frame to generate flow code as a part of the compressed code and a reconstructed flow for the current frame, generating a compensated frame by applying a flow operator to the one or more previously reconstructed frames and the reconstructed flow, generating a residue frame by computing a difference between the current frame and the compensated frame, applying the residue autoencoder to the compensated frame and the residue frame to generate residue code as another part of the compressed code and a reconstructed residue frame, and generating a reconstructed version of the current frame by combining the reconstructed residue frame and the compensated frame.

9. The method of claim 1, wherein the one or more values of the encoding parameter represent one or more bitrate levels, wherein the parameter map for the training frame includes a plurality of encoded vectors for a plurality of regions in the training frame, each encoded vector representing a bitrate level for a respective region in the training frame, and wherein the reconstruction loss for a region in the training frame increases when the respective bitrate level for the region increases.

10. The method of claim 1, wherein the parameter map is represented as a one-hot encoded vector including one or more elements each corresponding to a respective value in the one or more values of the encoding parameter.

11. The method of claim 1, wherein layers of the machine learned compression model are comprised of nodes, and the codelayer is bottleneck layer comprising fewer nodes than other layers of the machine learned compression model.

12. A non-transitory computer-readable medium containing instructions for execution on a processor, the instructions comprising:

accessing a machine-learned compression model coupled to receive a frame and a parameter map for the frame, and output compressed code at a codelayer and a reconstructed version of the frame, wherein at least a portion of the compression model is configured as a neural network including the codelayer and the compression model is trained by:

obtaining a video including a set of training frames, each training frame associated with a parameter map that indicates one or more values of an encoding parameter for the training frame, and changing weights of the compression model in conjunction with value(s) of the codelayer to reduce a loss function, the loss function including a reconstruction loss that indicates a difference between the set of training frames and reconstructed versions of the training frames, and a codelength loss that indicates codelength of a compressed code for the training frames, wherein the loss function changes depending on a value of the encoding parameter for the training frames, and wherein the compressed codes for at least two training frames with different values of the encoding parameter are generated at the same codelayer;

iteratively performing, for each current frame in a set of source frames:

obtaining a parameter map for the current frame, and applying at least a portion of the machine-learned compression model including the changed weights and codelayer value(s) to the current frame and the parameter map for the current frame to generate compressed code for the current frame; and transmitting the compressed codes generated for the set of source frames to a receiver system.

13. The non-transitory computer-readable medium of claim 12, wherein the one or more values of the encoding parameter represent one or more bitrate levels, and wherein the codelength loss increases when a bitrate level for the training frame increases.

14. The non-transitory computer-readable medium of claim 12, wherein the instructions further comprise:

performing an interpolation operation to generate the parameter map for the current frame that represents an interpolated value for the encoding parameter between the one or more values of the encoding parameter.

15. The non-transitory computer-readable medium of claim 12, wherein the compression model is further configured to include the parameter map in the compressed code for a decoder at the receiver system configured to obtain the parameter map from the compressed code.

16. The non-transitory computer-readable medium of claim 12, wherein the portion of the machine-learned compression model includes one or more subsets of weights, each subset of weights associated with a respective value for the encoding parameter, and wherein applying the portion of the machine-learned compression model to the current frame and the parameter map for the current frame further comprises selecting a respective subset of weights associated with a value for the encoding parameter for the current frame, and applying the respective subset of weights to the current frame.

17. The non-transitory computer-readable medium of claim 12, wherein the machine-learned compression model includes a flow autoencoder and a residue autoencoder, and applying the portion of the machine-learned compression model to the current frame and the parameter map for the current frame further comprises:

obtaining zero or more previously reconstructed frames for the current frame, applying the flow autoencoder to the current frame, the zero or more previously reconstructed frames, and the parameter map for the current frame to generate flow code as a part of the compressed code and a reconstructed flow for the current frame, generating a compensated frame by applying a flow operator to the one or more previously reconstructed frames and the reconstructed flow, generating a residue frame by computing a difference between the current frame and the compensated frame, applying the residue autoencoder to the compensated frame and the residue frame to generate residue code as another part of the compressed code and a reconstructed residue frame, and generating a reconstructed version of the current frame by combining the reconstructed residue frame and the compensated frame.

18. The non-transitory computer-readable medium of claim 12, wherein the machine-learned compression model includes a flow predictor portion, a flow autoencoder, and a residue autoencoder, and applying the portion of the machine-learned compression model to the current frame and the parameter map for the current frame further comprises:

obtaining one or more previously reconstructed frames for the current frame, applying the flow predictor portion to the one or more previously reconstructed frames or previous flow for the one or more previously reconstructed frames to generate a flow prediction for the current frame, generating a predicted frame by applying a flow operator to the one or more previously reconstructed frames and the flow prediction, applying the flow autoencoder to the current frame and the predicted frame, and the parameter map for the current frame to generate flow code as a part of the compressed code and a reconstructed flow for the current frame, generating a compensated frame by applying a flow operator to the one or more previously reconstructed frames and the reconstructed flow, generating a residue frame by computing a difference between the current frame and the compensated frame, applying the residue autoencoder to the compensated frame and the residue frame to generate residue code as another part of the compressed code and a reconstructed residue frame, and generating a reconstructed version of the current frame by combining the reconstructed residue frame and the compensated frame.

19. The non-transitory computer-readable medium of claim 12, wherein the one or more values of the encoding parameter represent one or more bitrate levels, wherein the parameter map for the training frame includes a plurality of encoded vectors for a plurality of regions in the training frame, each encoded vector representing a bitrate level for a respective region in the training frame, and wherein the reconstruction loss for a region in the training frame increases when the respective bitrate level for the region increases.

20. The non-transitory computer-readable medium of claim 12, wherein the machine-learned compression model is further coupled to receive one or more previously reconstructed frames for the frame to generate the compressed code and the reconstructed version of the frame, and wherein the one or more values of the encoding parameter for the training frame further represents:

(i) whether the training frame will be processed as a P-frame with a previously reconstructed frame that is placed temporally before the training frame in the video, (ii) whether the training frame will be processed as a $B_1$-frame with two or more previously reconstructed frames that were processed as a P-frame or an I-frame, (iii) whether the training frame will be processed as a $B_2$-frame with a previously reconstructed frame that was processed as a P-frame or an I-frame and another previously reconstructed frame that was processed as a $B_1$-frame, or (iv) whether the training frame will be processed as a $B_3$-frame with a previously reconstructed frame that was processed as a $B_1$-frame and another previously reconstructed frame that was processed as a $B_2$-frame.

21. The non-transitory computer-readable medium of claim 12, wherein the parameter map is represented as a one-hot encoded vector including one or more elements each corresponding to a respective value in the one or more values of the encoding parameter.

* * * * *